US008276506B2

(12) United States Patent
Tojo et al.

(10) Patent No.: US 8,276,506 B2
(45) Date of Patent: Oct. 2, 2012

(54) COOKING ASSISTANCE ROBOT AND COOKING ASSISTANCE METHOD

(75) Inventors: Tsuyoshi Tojo, Kadoma (JP); Takanobu Tanimoto, Kadoma (JP); Osamu Mizuno, Kadoma (JP); Tohru Nakamura, Kadoma (JP); Soichiro Fujioka, Kadoma (JP)

(73) Assignee: Panasonic Corporation, Osaka (JP)

( * ) Notice: Subject to any disclaimer, the term of this patent is extended or adjusted under 35 U.S.C. 154(b) by 1027 days.

(21) Appl. No.: 12/249,337

(22) Filed: Oct. 10, 2008

(65) Prior Publication Data
US 2009/0099691 A1    Apr. 16, 2009

(30) Foreign Application Priority Data

Oct. 10, 2007 (JP) ................................. 2007-264280
Oct. 3, 2008 (JP) ................................. 2008-258882

(51) Int. Cl.
*A47J 37/00* (2006.01)
(52) U.S. Cl. ................. 99/334; 99/325; 99/348
(58) Field of Classification Search ................ 99/348, 99/325, 334
See application file for complete search history.

(56) References Cited

U.S. PATENT DOCUMENTS

| 4,503,502 A * | 3/1985 | Chapin ........................... 700/90 |
| 5,088,390 A * | 2/1992 | Wong et al. .................... 99/327 |
| 7,011,013 B2 * | 3/2006 | Leason .......................... 99/339 |
| 7,174,830 B1 * | 2/2007 | Dong ............................ 99/334 |
| 7,930,973 B2 * | 4/2011 | Wong ............................ 99/334 |
| 2004/0172380 A1 * | 9/2004 | Zhang et al. .................. 707/1 |

FOREIGN PATENT DOCUMENTS

| JP | 64-2882 | 1/1989 |
| JP | 5-3073 | 1/1993 |
| JP | 6-261831 | 9/1994 |
| JP | 2000-246684 | 9/2000 |
| JP | 2000-325238 | 11/2000 |
| JP | 2003-290045 | 10/2003 |
| JP | 2005-504259 | 2/2005 |

OTHER PUBLICATIONS

Notice of Reasons for Rejection (with English translation) issued Oct. 6, 2009 in corresponding Japanese Application No. 2008-25882.
Notice of Reasons for Rejection (with English translation) issued Oct. 6, 2009 in corresponding Japanese Application No. 2008-258882.

* cited by examiner

*Primary Examiner* — Benjamin Layno
(74) *Attorney, Agent, or Firm* — Wenderoth, Lind & Ponack, L.L.P.

(57) ABSTRACT

A cooking assistance robot is capable of efficient mixing using ingredients that are unlikely to be evenly heated. The cooking assistance robot performs cooking by physically moving ingredients in a cooking container selects a mixing direction for leveling a mountain and performs a mountain leveling operation in the selected mixing direction in a presence of a mountain of a specified height or higher in the cooking container.

16 Claims, 17 Drawing Sheets

FIG. 7
HEIGHT SECTION
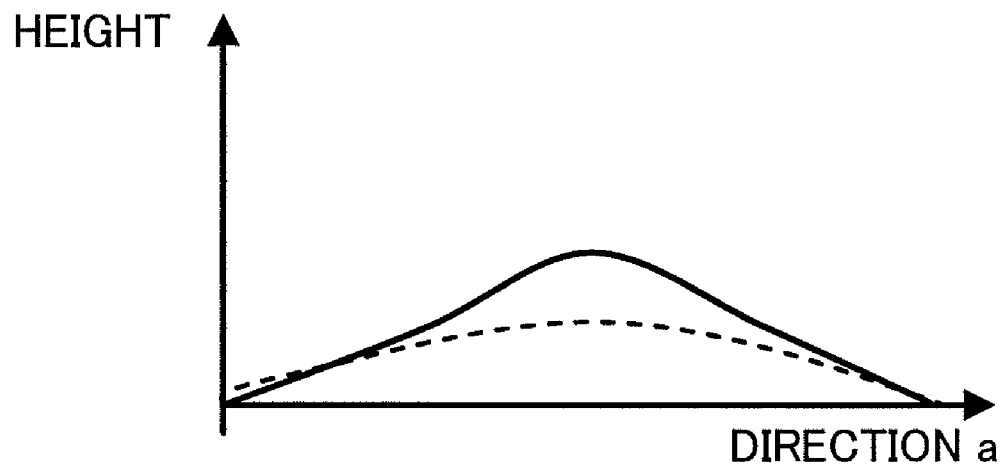
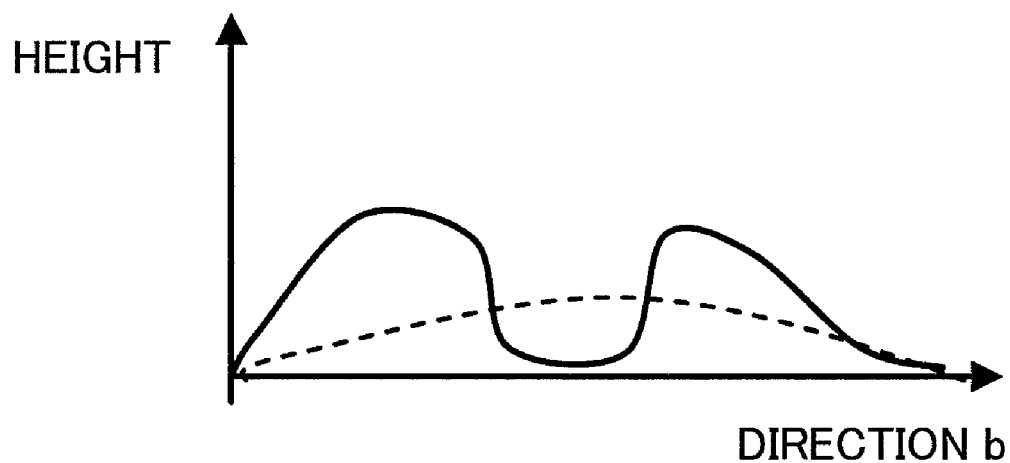
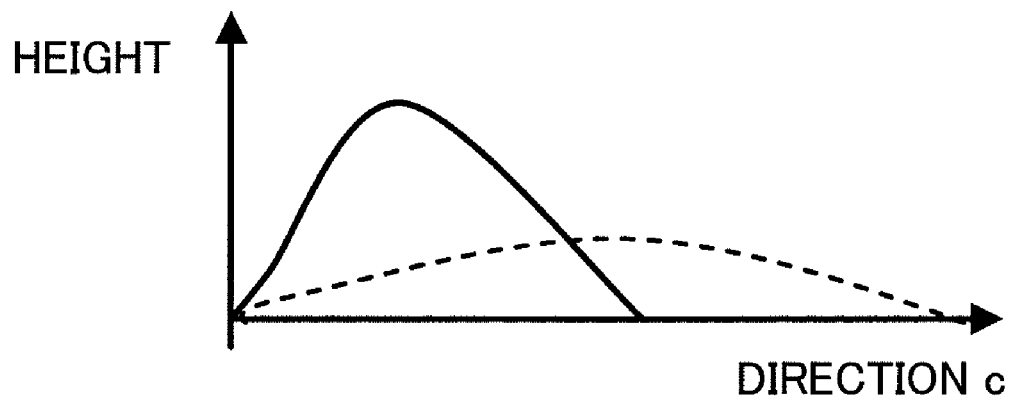

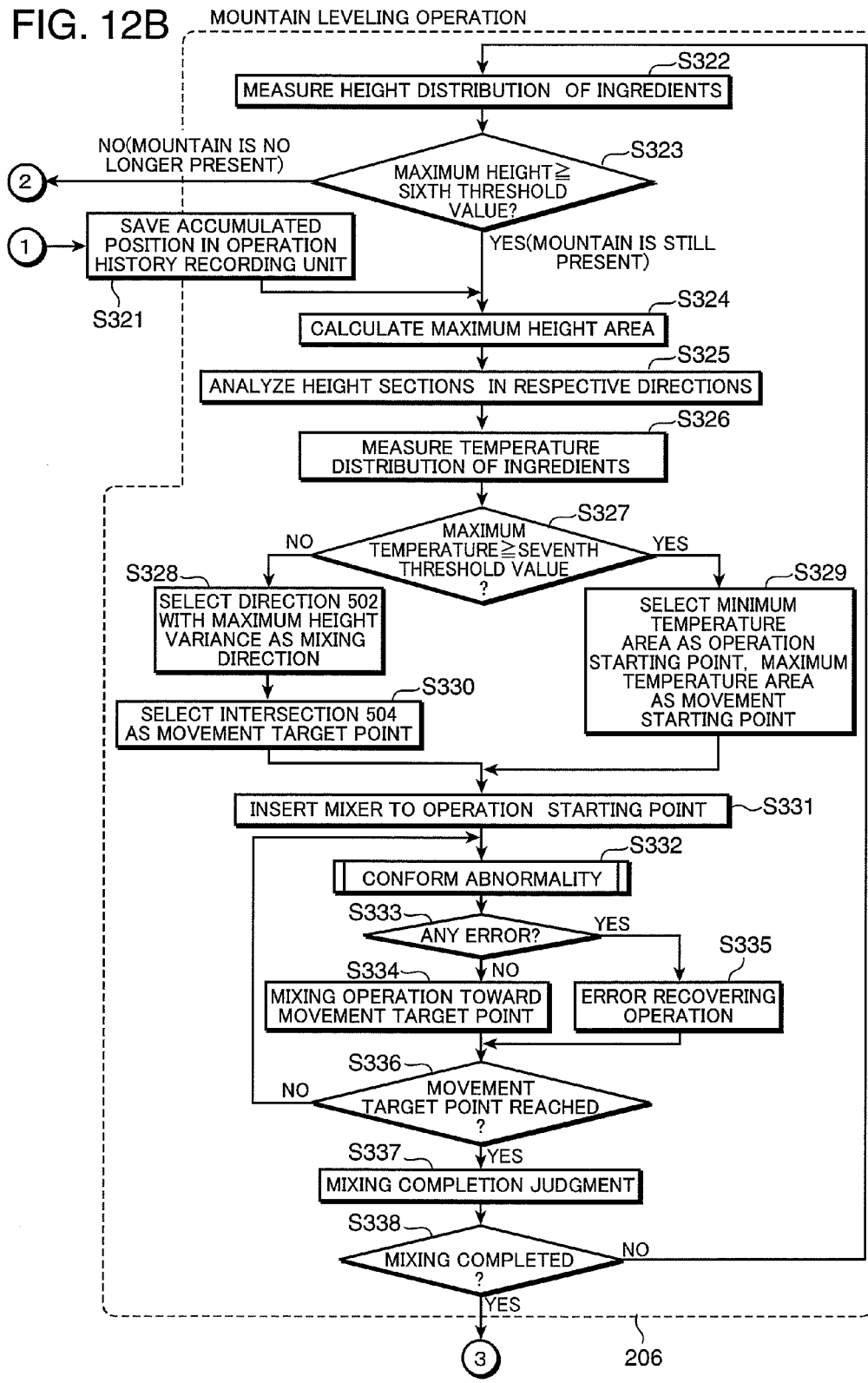

COOKING ASSISTANCE ROBOT AND COOKING ASSISTANCE METHOD

TECHNICAL FIELD

The present invention relates to a food cooking assistance method and cooking assistance robot for business use or home use. Particularly, the present invention relates to a cooking assistance method and cooking assistance robot for an operation of mixing ingredients put in a cooking container such as a pan.

DESCRIPTION OF THE BACKGROUND ART

In recent years, cooking assistance devices for performing a standard operation instead of humans having been developed for higher efficiency and labor saving and are being used particularly in restaurant industry and the like. Many of these devices include a mixing blade, mix ingredients in a fixed large-size pan by actively rotating the mixing blade and heat all the ingredients.

However, for example, at the time of stir-frying, ingredients burn if being left stationary, wherefore it is necessary to perform a so-called basic operation of stir-frying, which is normally done by a person at the time of cooking by mixing ingredients using a cooking paddle while shaking a pan upward and downward. Thus, there is a problem that the above cooking devices cannot perform a cooking operation depending on the type of cooking.

In order to solve this problem, some cooking devices include an actively rotatable cooking container and a similarly actively rotatable spiral mixing element or a mixing paddle structured to be able to passively change an angle in conformity with the movement of ingredients. This proposes technology for actively mixing all the ingredients to evenly mix the ingredients while preventing the ingredients from being burnt in the case of being stir-fried (for example, see Japanese Unexamined Patent Publication No. H06-261831).

However, these cooking assistance devices and mixing devices are designed to evenly mix all the ingredients by causing the mixing blade or mixing element or the entire cooking container to repeatedly perform predetermined operations (rotation, shaking). Thus, there is a likelihood of unevenly heating the ingredients according a change in the state of the ingredients being mixed.

SUMMARY OF THE INVENTION

In view of the above problem, an object of the present invention is to provide a cooking assistance robot and a cooking assistance method capable of efficient mixing to make it difficult to cause uneven heating of ingredients.

One aspect of the present invention is directed to a cooking assistance robot, comprising a mix driving unit for performing a mixing operation of moving ingredients in a cooking container; a height distribution measuring unit for measuring a distribution of a height of the ingredients from a cooking of the cooking container; a mixing direction selector for selecting a mixing direction of the mixing operation if the height of the ingredients measured by the height distribution measuring unit is equal to or larger than a specified value; and an operation instructing unit for instructing the mixing operation corresponding to the mixing direction to the mix driving unit.

Another aspect of the present invention is directed to a cooking assistance method by a cooking assistance robot, comprising the steps of measuring a distribution of a height of ingredients from a cooking surface of a cooking container in a cooking assistance robot; judging whether or not the height of the ingredients in the cooking container is equal to or larger than a specified height in the cooking assistance robot; selecting, in the cooking assistance robot, a mixing direction for leveling a mountain in a presence of the mountain of the specified height or higher while selecting a mixing direction for making the mountain in the presence of only areas lower than the specified height; and moving the ingredients in the selected mixing direction using a mix driving unit of the cooking assistance robot.

According to these inventions, efficient mixing can be performed, with which the ingredients in the cooking container are unlikely to be unevenly heated.

DETAILED DESCRIPTION OF THE PREFERRED EMBODIMENTS OF THE INVENTION

Hereinafter, embodiments of the present invention are described with reference to the accompanying drawings. The following embodiments are merely specific examples of the present invention and are not of the nature to limit the technical scope of the present invention.

First Embodiment

First of all, a cooking assistance robot according to a first embodiment of the present invention is described.

A cooking assistance robot according to the first embodiment of the present invention measures a height distribution of ingredients from a cooking surface of a cooking container by a height distribution measuring unit and changes the position and posture of a mixer according to the height distribution by a mixer driving unit. In this way, the cooking assistance robot assists cooking by evenly mixing the ingredients while reducing the burning and shape loss of the ingredients.

In the first embodiment of the present invention is described a cooking assistance robot for regulating a mixing operation according to the height distribution of the ingredients. This cooking assistance robot is provided with means for holding the mixer and changing the position and posture of the mixer and means for measuring the height distribution of the ingredients.

Figure 1:
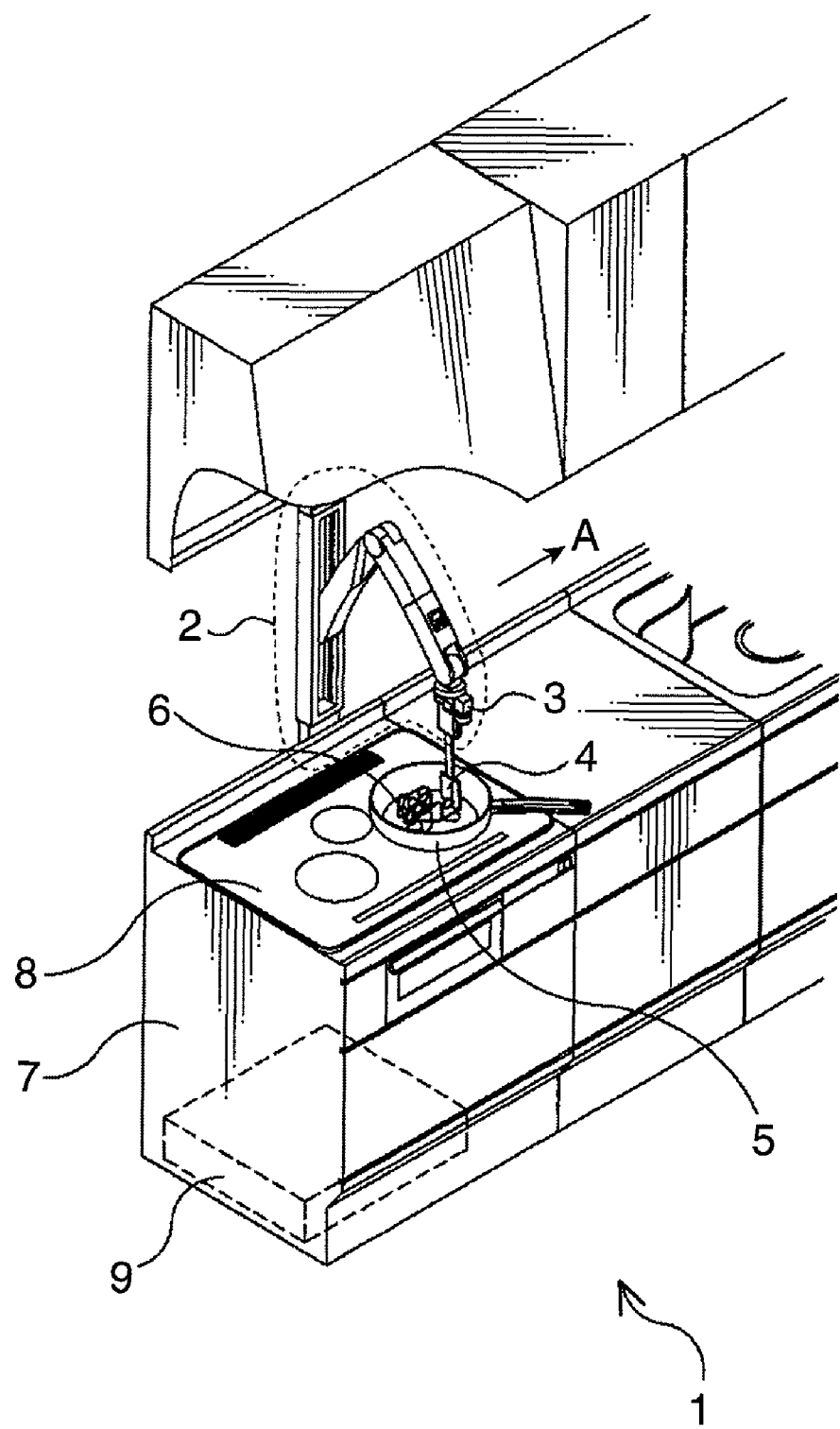
FIG. 1 is a diagram outlining a cooking assistance robot according to a first embodiment of the invention.

FIG. 1 is a diagram outlining the cooking assistance robot according to the first embodiment of the present invention. As shown in FIG. 1, a cooking assistance robot 1 according to the first embodiment of the present invention is provided with a height distribution measuring unit 3, a mixer driving unit 2 and a control unit 9. The height distribution measuring unit 3 measures the height distribution of ingredients 6 in a cooking container 5 arranged on a cooking heating stove 8. The measured height distribution is also referred to as height distribution information below. The mixer driving unit 2 holds a mixer 4 and changes the position and posture of the mixer 4. The control unit 9 controls the mixer driving unit 2 based on the height distribution information obtained by the height distribution measuring unit 3. The mixer 4 is a rectangular plate member having a vertical dimension of about 100 mm and a horizontal dimension of about 70 mm. The mixer 4 is held onto the mixer driving unit 2 by a connecting portion having a length of 150 mm.

Figure 2:
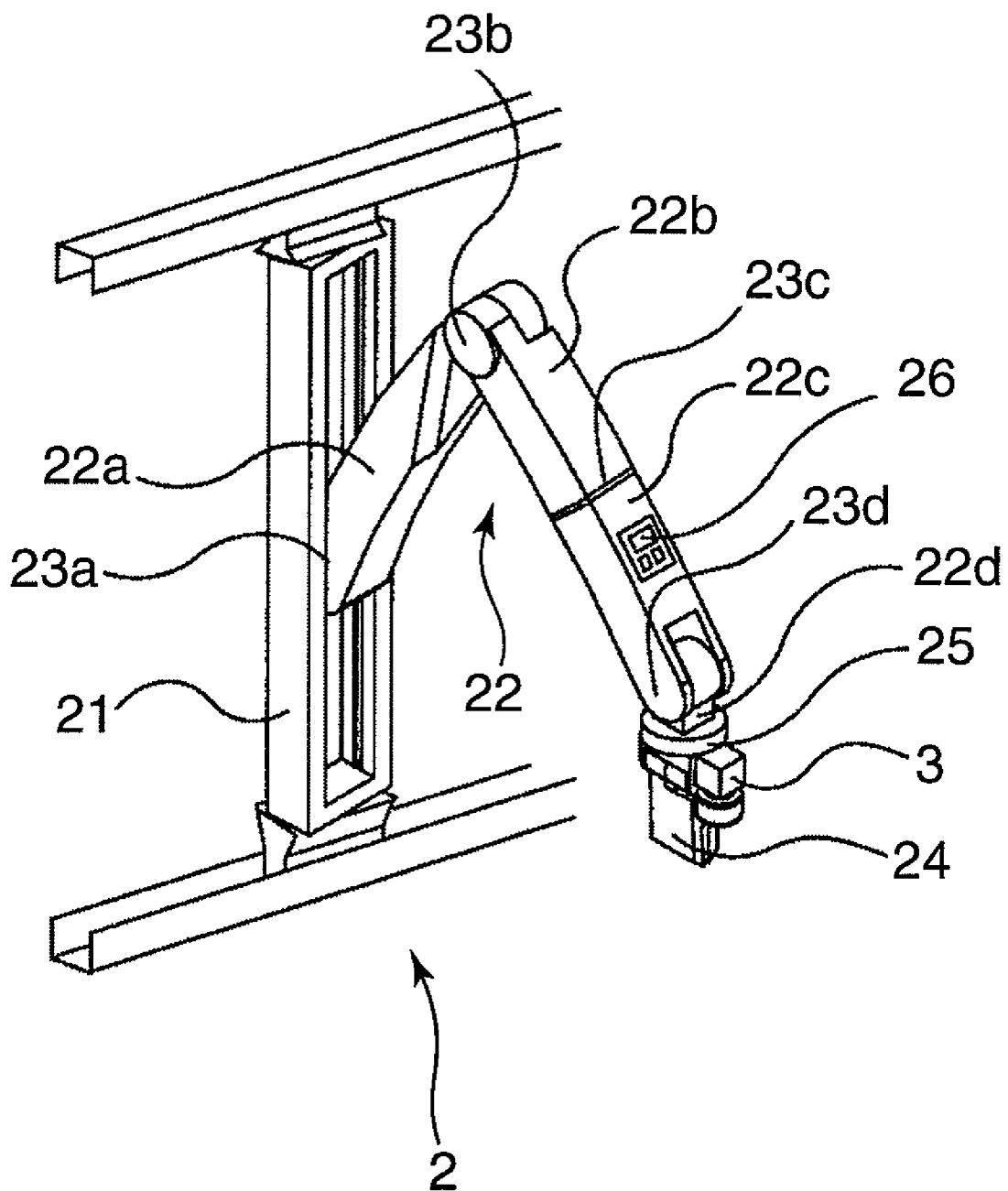
FIG. 2 is a diagram showing the detailed construction of a mixer driving unit of the cooking assistance robot of FIG. 1.

Here, the construction of the mixer driving unit 2 is described in more detail. FIG. 2 is a diagram showing the construction of the mixer driving unit 2 of the cooking assistance robot 1 according to the first embodiment of the present invention.

The mixer driving unit 2 includes a hand portion 24 for holding the mixer 4, a force detector 25 for detecting an external force acting on the hand portion 24, an arm portion 22 for changing the position and posture of the hand portion 24, a supporting portion 21 for changing the position and posture of the arm portion 22 and joint portions 23 (23a to 23d) for connecting the hand portion 24, the arm portion 22 and the supporting portion 21. Although the mixer 4 is held by the hand portion 24 in this embodiment, the hand portion 24 is so constructed as to be able to hold not only the mixer 4, but also members suitably corresponding to contents of cooking.

The supporting portion 21 is so constructed as to make linear movements in the longitudinal direction of a kitchen 7 and rotational movements about an axis extending in the vertical direction of the kitchen 7. Further, the supporting portion 21 can be controlled to stop at a specified position by unillustrated driving servo motor, speed reducer, optical encoder for position detection and drive belt. Thus, the arm portion 22 and the hand portion 24 can be freely moved in the longitudinal direction of the kitchen 7 (direction A in FIG. 1). The supporting portion 21 also supports the joint portion 23a such that an arm 22a can make linear movements in the vertical direction of the kitchen 7 and rotational movements about the axis extending in the longitudinal direction of the kitchen 7. The supporting portion 21 can be driven to make linear movements using a general linear driving mechanism including a linear motor, a ball screw or the like. The vertical length of the supporting portion 21 is about 800 mm.

The arm portion 22 includes a plurality of joint portions 23a to 23d. Here, each of the joint portions 23a, 23b, 23c and 23d includes a driving servo motor (not shown) for changing the angle of the joint, a speed reducer (not shown) and an optical encoder (not shown) for detecting a joint angle. Since the driving servo motor can be stopped at a specified position in each movable range by the optical encoder, the arm portion 22 can assume an arbitrary posture. The length of the arm 22a is about 500 mm. The sum of the lengths of the arms 22b, 22c is about 500 mm.

For example, a known robot arm such as a six-axis robot arm generally commercially available as an industry robot can be used as the arm portion 22 and the joint portions 23.

The mixer driving unit 2 includes four movable parts with respect to the supporting portion 21 for making linear movements in the longitudinal direction of the kitchen 7, linear movements in the vertical direction of the kitchen 7, rotational movements about the axis in the vertical direction of the kitchen 7 and rotational movements about an axis in the longitudinal direction of the kitchen 7 and four movable parts with respect to the joint portions 23a to 23d, i.e. a total of eight movable parts. However, it is sufficient to include at least six movable parts for arbitrarily changing the position and posture of the hand portion 24 with respect to an absolute coordinate system in which the kitchen 7 is fixed.

The hand portion 24 is connected to the arm 22d via the force detector 25 for detecting an acting external force. A gripper hand with two fingers generally commercially available for industry use can be, for example, used as the hand portion 24, but the mixer 4 may be fixed and held onto the arm portion 22 using a general fixing device.

A sensor generally commercially available as a six-axis or three-axis force sensor can be used as the force detector 25. For example, a strain gauge type three-axis force sensor, capacitance six-axis force sensor or the like can be used as such.

Although one mixer driving unit 2 is provided in the first embodiment of the present invention, the number of the mixer driving unit is not limited to this. Two mixer driving units 2 may be used, wherein one supports the cooking container 5 and the other performs a mixing operation using the mixer 4.

For example, a range image pickup device can be used as the height distribution measuring unit 3. An example of the range image pickup device is such that infrared ray is projected, the infrared ray returning by being reflected by an object is detected by sensors arranged in a lattice, a distance to the object is outputted as a two-dimensional range image based on a time difference between light projection and light reception and the velocity of the light. Another example may be a known range image pickup device by stereo vision. Although the height distribution of the ingredients 6 is measured using an infrared range image sensor in this embodiment, it is also possible to use such a general distance sensor as to output an average distance in a narrow region such as an ultrasonic distance sensor. Specifically, the height distribution of the entire surface of the cooking container 5 may be measured by mounting a distance sensor on the arm portion 22 or the hand portion 24 of the mixer driving unit 2 and continuously conducting distance measurements while scanning a measurement range.

A wired cable or any communication means arbitrarily selected from known wireless and infrared communication means can be used to transmit information between the control 9 and the height distribution measuring unit 3.

Although the height distribution measuring unit 3 is mounted on the hand portion 24, it is sufficient to be able to measure the height distribution of the ingredients 6 in the cooking container 5. Accordingly, the height distribution measuring unit 3 may be fixed to another movable part or fixed part, e.g. to the cooking heating stove 8.

Figure 3:
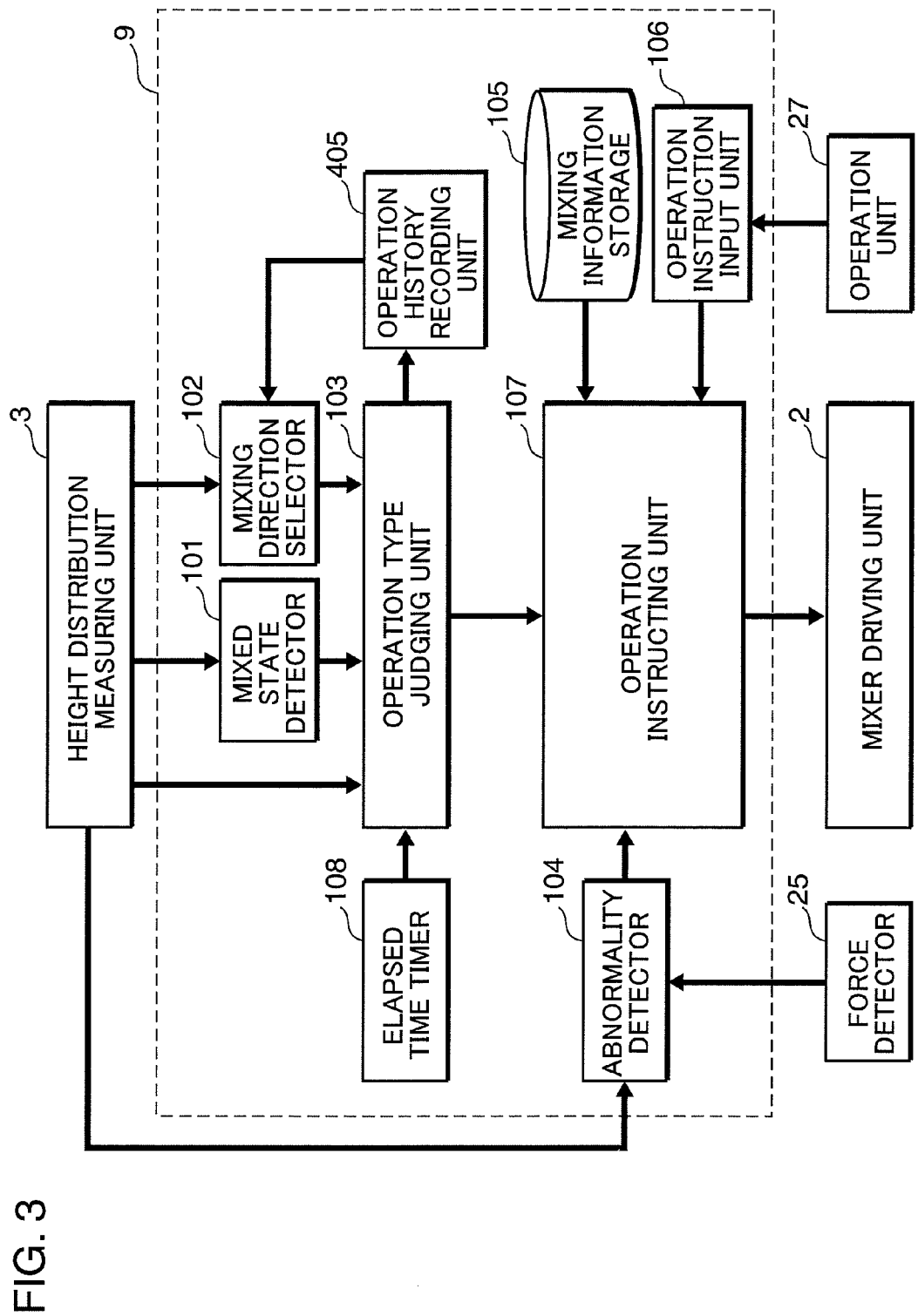
FIG. 3 is a block diagram showing the electrical construction of the cooking assistance robot of FIG. 1, FIG. 4A and FIG. 4B are flow charts showing processing steps of the cooking assistance robot of FIG. 1.

Here, the construction of the cooking assistance robot 1 is described in more detail. FIG. 3 is a block diagram showing the construction of the cooking assistance robot 1 according to the first embodiment of the present invention.

The cooking assistance robot 1 is provided with the height distribution measuring unit 3, a mixed state detector 101, a mixing direction selector 102, an operation type judging unit 103, the force detector 25, an abnormality detector 104, a mixing information storage 105, an operation instruction input unit 106, an operation instructing unit 107 and an operation history recording unit 405, and an elapsed time timer 108. Here, the height distribution measuring unit 3 measures the height distribution of the ingredients 6 in the cooking container 5. The mixed state detector 101 estimates a mixed state of the ingredients 6 based on the height distribution. The mixing direction selector 102 selects a direction of the mixing operation from the height distribution of the ingredients 6. The operation type judging unit 103 judges to switch the operation type depending on a specified mixing direction selecting condition based on information outputted from the height distribution measuring unit 3, the mixed state detector 101 and the mixing direction selector 102. The force detector 25 detects an external force acting on the hand portion 24. The abnormality detector 104 detects an abnormal state using outputs from the height distribution measuring unit 3 and the force detector 25. The mixing information storage 105 stores mixing operation parameters for cooking in relation to the ingredients 6 and cooking recipes. The operation instruction input unit 106 inputs an instruction from a user by means of an operation unit 27. The operation instructing unit 107 gives an operation instruction based on the outputs from the operation type judging unit 103, the abnormality detector 104 and the operation instruction input unit 106 and the operation parameter from the mixing information storage 105. The operation history recording unit 405 records the mixer driving unit 2 for changing the position and posture of the mixer 4 and a history of mixing operations by the mixer driving unit 2 in response to a command from the operation instructing unit 107. The elapsed time timer 108 is referred to to stop the operation upon the elapse of an operation time specified by the user.

The respective functions of the mixing state detector 101, the mixing direction selector 102, the operation type judging unit 103, the abnormality detector 104, the mixing information storage 105, the operation instruction input unit 106, the operation instructing unit 107, the operation history storage 405 and the elapsed time timer 108 may be realized by hardware such as special circuits or may be realized by being described by software and implemented in a computer.

The mixing state detector 101 calculates a maximum height area, a minimum height area and a height variance of the ingredients 6 in the cooking container 5 based on the output result from the height distribution measuring unit 3. If the variance is equal to or larger than a predetermined threshold value, the mixing of the ingredients 6 is judged to be insufficient. Further, a result is outputted, judging that the maximum height area is a part of the ingredients where temperature is low and the minimum height area is a part of the ingredients where temperature is high.

The mixing direction selector 102 determines a starting position and a target position of an operation of making a mountain of the ingredients 6 and a starting position and a target position of an operation of leveling the mountain based on the output result of the height distribution measuring unit 3, and selects moving directions of the mixer 4 to accumulate and disperse the ingredients 6 to the target position.

The operation type judging unit 103 selects a mountain making operation or a mountain leveling operation as a mixing operation to be performed based on the maximum height of the ingredients 6 in the cooking container 5.

The force detector 25 measures an external force acting on the hand portion 24. Thus, an excessive external force can be detected which is produced in the event of abnormality such as in the case where the mixer 4 collides with the inner wall of the cooking container 5, in the case where the ingredients 6 are squeezed between the cooking container 5 and the mixer 4 or in the case where the mixer 4 comes into contact with the user, and the operation can be safely stopped in a moment.

The abnormality detector 104 detects an abnormal state based on the output results from the height distribution measuring unit 3 and the force detector 25 and notifies the abnormal state to the operation instructing unit 107. The abnormality detector 104 also detects a state where the ingredients 6 are about to spill out of the cooking container 5 based on the result of the height distribution measuring unit 3.

The mixing information storage 105 stores mixing parameters preset as those suitable for the types of the ingredients 6 and cooking recipes and can output them to the operation instructing unit 107. Thus, the operation instructing unit 107 can instruct a mixing operation suitable for the ingredients 6 and the cooking recipe, whereby insufficient heating, shape loss and burning of the ingredients 6 can be reduced. A magnetic disk device such as a hard disk drive, a semiconductor memory or a like known storage device can be used as the mixing information storage 105.

The operation instruction input unit 106 can receive inputs made by the user using the operation unit 27 such as the type and amount of the ingredients 6, the type of the cooking recipe, the start and end of the operation.

The operation instructing unit 107 adjusts the operation parameter of the operation type determined by the operation type judging unit 103 and gives an operation instruction based on the instruction of the user inputted via the operation instruction input unit 106 and the mixing parameter stored in the mixing information storage 105. The operation instructing unit 107 also monitors notification from the abnormality detector 104 and instructs to move onto the next mixing operation or to stop the mixing operation depending on the content of abnormality.

The operation history recording unit 405 records a history of the performed mixing operations. The cooking surface of the cooking container 5 is divided into small areas, the presence of the ingredients 6 in the respective areas is detected using the height distribution measuring unit 3, and presence times are cumulatively recorded. In this way, the use frequencies of the respective small areas can be calculated. If not only the height of the ingredients 6, but also the temperature of the cooking surface of the cooking container 5 are considered, the use frequencies can be more accurately calculated. The temperature of the cooking surface of the cooking container 5 can be measured by a temperature distribution measuring unit 310 to be described later or a temperature distribution measuring mechanism (not shown) provided on the cooking heating stove 8. Specifically, in the case of using the temperature distribution measuring unit 310, the cooking surface of the cooking container 5 can be measured. On the other hand, in the case of using the temperature distribution measuring mechanism of the cooking heating stove 8, the temperature of the bottom surface of the cooking container 5 can be measured and the temperature of the cooking surface of the cooking container 5 can be estimated from this temperature of the bottom surface. The operation history recording unit 405 also records a position (accumulated position) of the cooking surface of the cooking container 5 where the mountain of the ingredients 6 is formed (Step S19 of FIG. 4).

The mixer driving unit 2 changes the position and posture (particularly, angle) of the mixer 4 with respect to the cooking container 5 while holding the mixer 4. In this way, the ingredients 6 in the cooking container 5 are mixed.

Figure 4A:
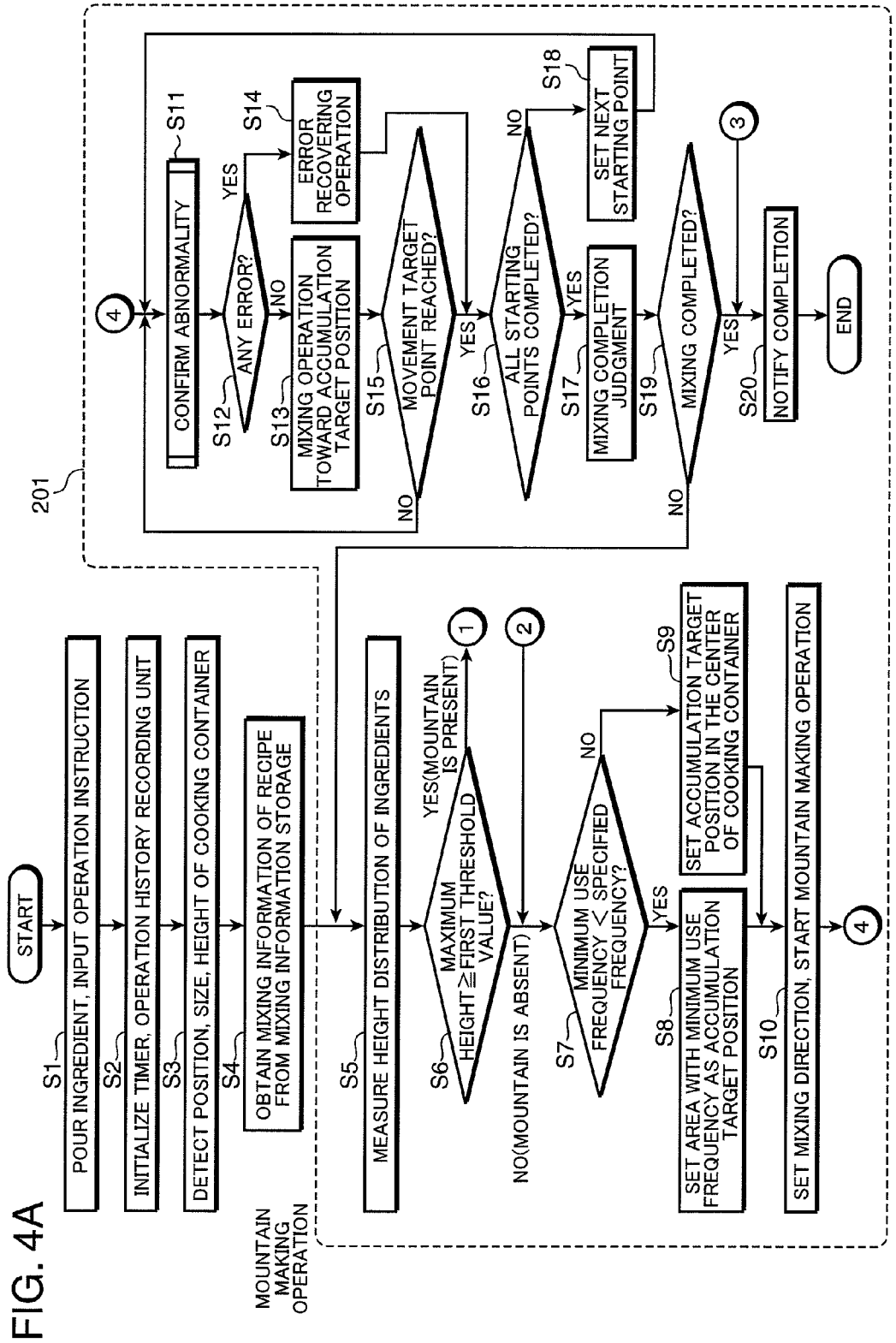
Figure 4B:
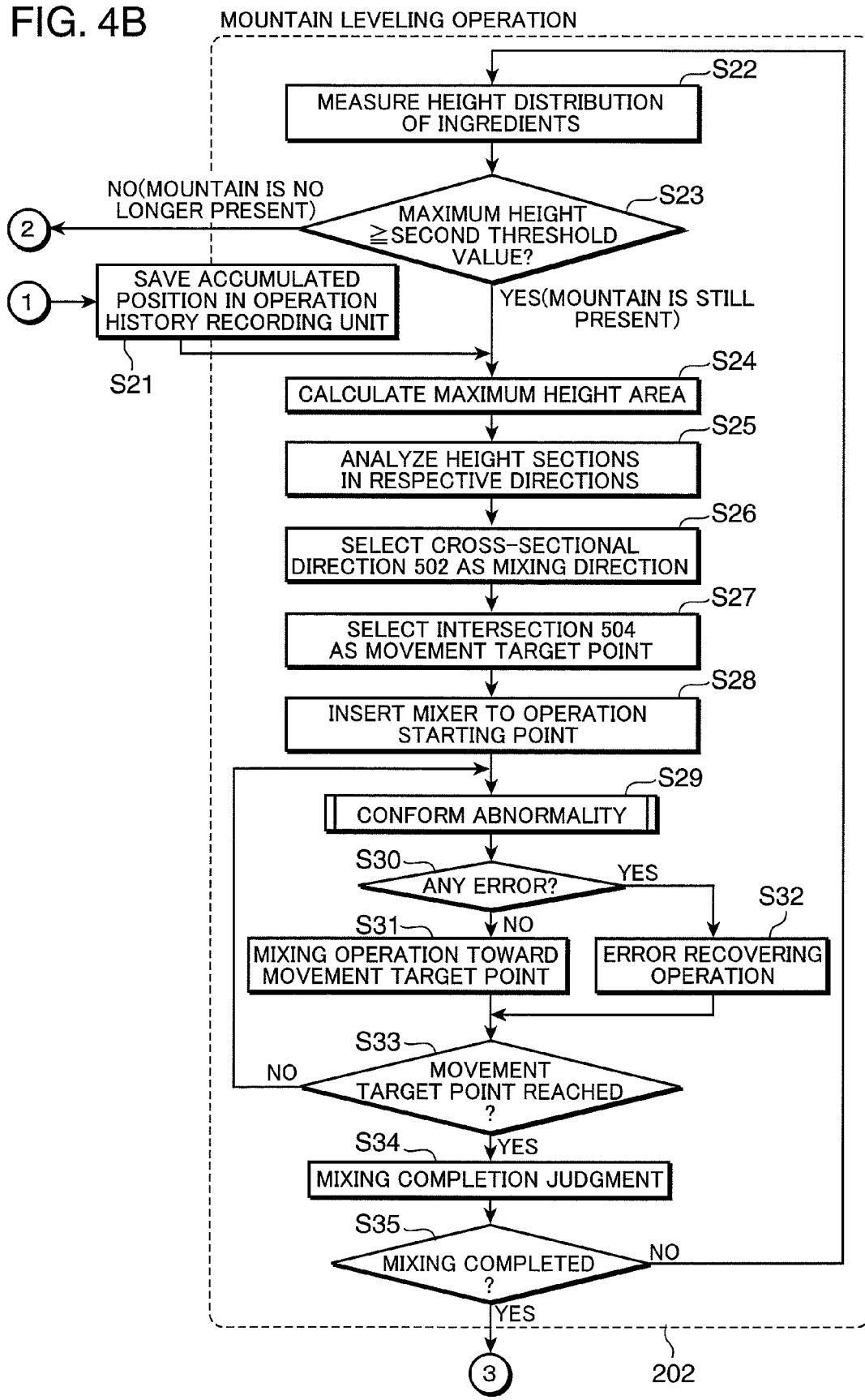

Next, the operation of the cooking assistance robot 1 is described. FIG. 4A and FIG. 4*b* are flow charts showing processing steps of the cooking assistance robot 1 in the first embodiment of the present invention.

An outline of a basic operation is to perform the mixing operation while alternately repeating a mountain making operation 201 and a mountain leveling operation 202 after various initializations.

First of all, the cooking assistance robot 1 waits on standby until an instruction of the user is inputted, i.e. until it is completed by the user to turn a cooking heating stove 8 on, to pour ingredients 6 and to input an operation instruction (Step S1). Here, in order to reduce burden on the user, the cooking heating stove 8 may be turned on when the operation of the cooking assistance robot 1 of the present invention is started. A method for recognizing voice uttered by the user, a method for recognizing the gesture of the user picked up by an image pickup camera, a method using a touch panel and the like can be cited as methods for inputting an operation instruction.

If the user inputs an operation start by specifying the cooking recipe or ingredients to be used, used amount of the ingredients and an operation time using the operation unit 27, the elapsed time timer 108 and the operation history recording unit 405 are initialized (Step S2). Subsequently, the position and size of the cooking container 5 and the height of the peripheral edge thereof are measured (Step S3). A measuring method using the aforementioned height distribution measuring unit 3 is thought as a method for measuring these. Another measuring method may be such that the mixer 4 is moved along the inner wall of the cooking container 5 while maintaining an angle between the mixer 4 and the inner wall of the cooking container 5 and a pressing force of the mixer 4 against the cooking container 5 constant, and measurement is made by recording a change in the position of the mixer 4.

Subsequently, the operation parameter corresponding to the cooking recipe, the type and amount of the ingredients 6 and the operation time specified by the user is obtained from the mixing information storage 105 and set in the operation instructing unit 107 (Step S4), and then processing steps of the mountain making operation 201 follows.

In the mountain making operation 201, the height distribution of the ingredients 6 in the cooking container 5 from the cooking surface of the cooking container 5 is measured using the height distribution measuring unit 3 based on the position and size of the cooking container 5 detected in Step S2 (Step S5). If a maximum height of the height distribution is equal to or larger than a first threshold value of a mixing operation judging condition in the mixing operation parameter obtained in Step S4 (YES in Step S6), it is judged that a mountain is already present (mountain making operation is completed) and the present accumulated position of the ingredients 6 is recorded in the operation history recording unit 405 (Step S21) and next Step S24 follows.

Here, the first threshold value used is a value obtained in Step S4, but the sum of this value and the height of the cooking surface of the cooking container 5 measured in Step S3 may be used as such. This enables even cooking containers whose bottom parts have different thicknesses to be more accurately dealt with.

On the other hand, if the maximum height of the height distribution is below the first threshold value (NO in Step S6), a position with a lowest use frequency out of the use frequencies of the cooking surface of the cooking container 5 stored in the operation history recording unit 405 is read. In addition, it is judged whether or not this use frequency is below a preset use frequency (Step S7). If the user frequency is below the preset use frequency, the position with the lowest use frequency is set as an accumulation target position for making a mountain of the ingredients 6 (Step S8). On the other hand, if the use frequency exceeds the preset frequency in the entire area of the cooking container 5, the center of the cooking container 5 is set as the accumulation target position (Step S9).

Figure 5:
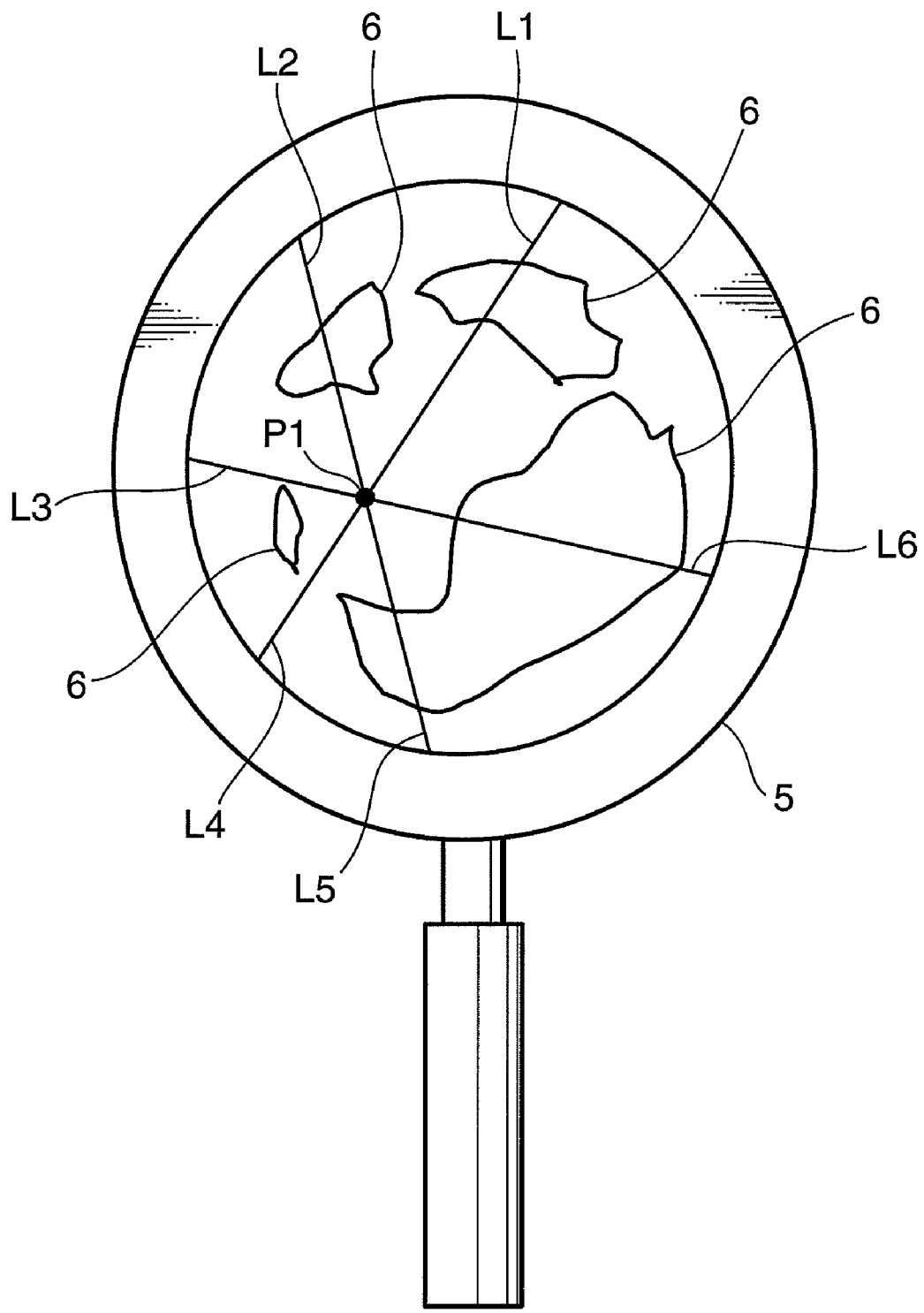
FIG. 5 is a schematic diagram of a cooking container when viewed in a direction perpendicular to a cooking surface of the cooking container.

Subsequently, a mixing direction for making the mountain of the ingredients 6 is set and the mountain making operation is started (Step S10). A method for specifying the mixing direction for making the mountain is described below with reference to FIG. 5. FIG. 5 is a schematic diagram showing the cooking container 5 when viewed in a direction perpendicular to the cooking surface of the cooking container 5. An exemplary case where the position with the lowest use frequency was selected as an accumulation target position P1 in Step S8 is described below.

First of all, the lengths of line segments connecting the accumulation target position P1 set in Step S8 and the inner wall of the cooking container 5, e.g. line segments L1 to L6 set at intervals of 60° about the accumulation target position P1 are calculated. Subsequently, out of the respective line segments L1 to L6, those whose lengths are, for example, longer than ⅓ of the diameter of the cooking container 5 are specified. Out of the opposite ends of each specified line segment, an end point toward the inner wall of the cooking container 5 is set as an operation starting point and an end point at the accumulation target position P1 is set as a movement target point, a direction from the operation starting point toward the movement target point is set as a mixing direction. In this way, mixing directions are successively selected for the line segments L1 to L6 set, for example, at intervals of 60°.

The case where the position with the lowest frequency is set as the accumulation target position P1 (Step S8) is described above. If the center of the cooking container 5 is set as the accumulation target position P1 (Step S9), directions along all the line segments L1 to L6 are set as mixing directions since all the line segments L1 to L6 have the length equal to the radius of the cooking container 5. If the center of the cooking container 5 is set as the accumulation target position P1, the direction of only the line segment corresponding to a virtual vertical plane with a largest variance with respect to the average height of the ingredients 6 on this virtual vertical plane out of a plurality of virtual vertical planes which are perpendicular to the cooking surface of the cooking container 5 and passing the center and the corresponding line segments L1 to L6 may be set as the mixing direction. In such a case as well, the ingredients 6 located in a range where they are drastically unevenly distributed can be moved, wherefore the ingredients 6 can be effectively mixed.

Subsequently, the mixer 4 is so inserted to the operation starting point obtained in Step S10 as to be perpendicular to the cooking surface of the cooking container 5. At this time, the leading end of the mixer 4 may be brought into contact with the cooking surface of the cooking container 5 or may be stopped at a position at a specified distance (e.g. 5 mm) from the cooking surface of the cooking container 5. It is also possible to scrape off the ingredients 6 adhering to the inner wall of the cooking container 5 to reduce the burning by inserting the mixer 4 to bring it into contact with the inner wall of the cooking container 5 while executing such a control as to exert a specified force in an outer circumferential direction of the cooking container 5.

Subsequently, abnormal states of the mixer 4 and the ingredients 6 are monitored by the abnormality detector 104 (Step S11). If an abnormal state (error) is detected (YES in Step S12), it is specified. An error recovering operation for the specified abnormal state is performed (Step S14), then a specified mixing operation completion confirming step S16 follows.

On the other hand, if no abnormal state is judged (NO in Step S12), a movement of the mixer 4 toward the accumulation target position is started by the mixer driving unit 2 (Step S13). Here, a moving distance of the mixer 4 is, for example, set to about 1/10 of the length of the line segment L1 to L6 for specifying the mixing direction. Further, the mixer 4 can be moved with a clearance defined between the cooking surface of the cooking container 5 and the mixer 4. On the other hand, the ingredients 6 in contact with the cooking surface of the cooking container 5 can be moved by moving the leading end of the mixer 4 while holding it in contact with the cooking surface of the cooking container 5 with a fixed force, wherefore the accumulated ingredients 6 can be evenly mixed. Further, by moving the mixer 4 while inclining it (e.g. by 60°) such that a part of the mixer 4 closer to the cooking container 5 moves ahead in the mixing direction, the ingredients 6 move onto the mixer 4 as the mixer 4 is moved, thereby replacing the ingredients 6 located below and those located above before mixing can be switched. After being inserted between the ingredients 6 and the cooking container 5 to place the ingredients 6 on the mixer 4, the mixer 4 is moved to a position above the ingredients 6 already located at the accumulation target position and the position and the posture of the mixer 4 are changed to place the ingredients 6 on the mixer 4 on the ingredients 6 located at the accumulation target position, whereby the ingredients distant from the cooking surface of the cooking container 5 and those closer thereto can be successively switched. Therefore, the heat of the cooking container 5 can be more evenly transferred to the ingredients 6.

Subsequently, it is judged whether or not the mixer 4 has reached a specified range from the accumulation target position as a result of the mixing operation (Step S15). This routine returns to the abnormal state detecting step (S11) for the mixer 4 and the ingredients 6 unless the specified range is not reached yet.

On the other hand, if the mixer 4 has reached the specified range from the accumulation target position (YES in Step S15), it is judged whether or not any one of the operation starting points set in Step S10 has not been selected yet (Step S16). Here, if there are unselected operation starting points (NO in Step S16), an arbitrary point is selected from the unselected operation starting points and set as the next operation starting point (Step S18). A method for selecting the operation starting point adjacent to the operation starting point where the mixing operation was already completed, a method for selecting the operation starting point with a maximum average height of the ingredients 6 located in the vicinity out of the unselected operation starting points and the like can be cited as a method for selecting the next operation starting point.

If there is no unselected operation starting point (YES in Step S16), mixing completion judgment (Step S17) is made. Here, the value of the elapsed time timer 108 and the value of the operation time specified by the user are compared and the mixing is judged to have been completed (Step S19) if these values match.

If the value of the elapsed time timer 108 lies in the operation time range specified by the user (NO in Step S19), the mixing is judged not to have been completed yet and this routine returns to the height distribution measuring step (Step S5).

On the other hand, if the mixing is judged to have been completed (YES in Step S19), the completion of the mixing is notified to the user using specified means if necessary and the operation is stopped (Step S20). General notification means such as means for outputting sound to the outside or light blinking means can be used as the specified means.

Next, processing steps of the mountain leveling operation 202 are described.

First of all, similar to the mountain making operation 201, the height distribution of the ingredients 6 in the cooking container 5 is measured using the height distribution measuring unit 3 based on the position and size of the cooking container 5 detected in Step S3 (Step S22). Subsequently, it is judged whether or not a maximum height of the height distribution measured by the height distribution measuring unit 3 is equal to or larger than a second threshold value of the mixing operation judging condition in the mixing operation parameter obtained in Step S4 (Step S23). If the maximum height is smaller than the second threshold value here (NO in Step S23), it is judged that the mountain has been completely leveled and Step S7 of the above mountain making operation 201 follows.

Figure 6:
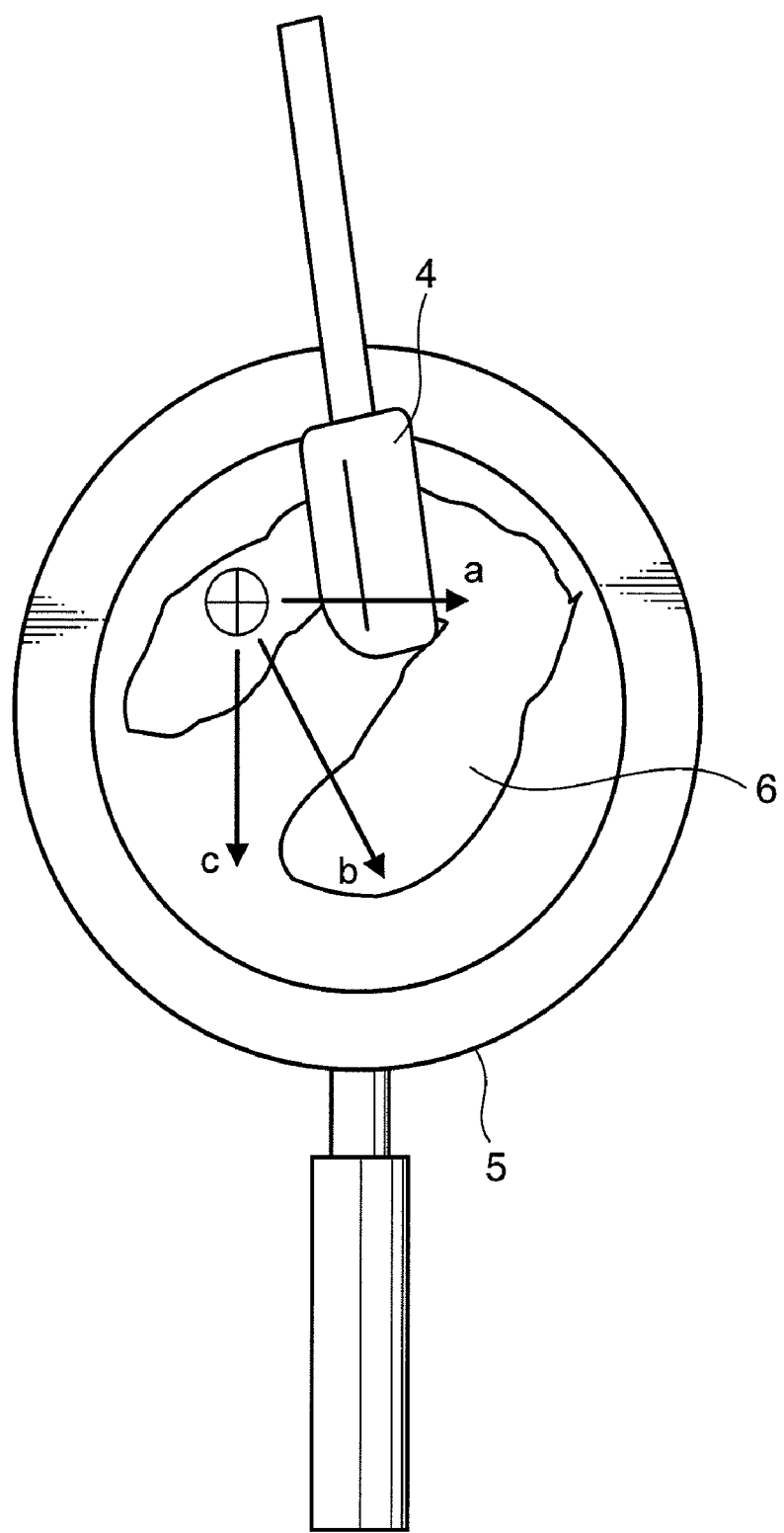
FIG. 6 is a schematic diagram of the cooking container when viewed in the direction perpendicular to the cooking surface of the cooking container, FIG. 7 are graphs showing cross-sectional shapes along directions "a", "b" and "c" of FIG. 6, FIGS. 8 are histograms showing distributions with respect to average heights for the cross-sectional shapes of FIGS. 7.
Figure 8:
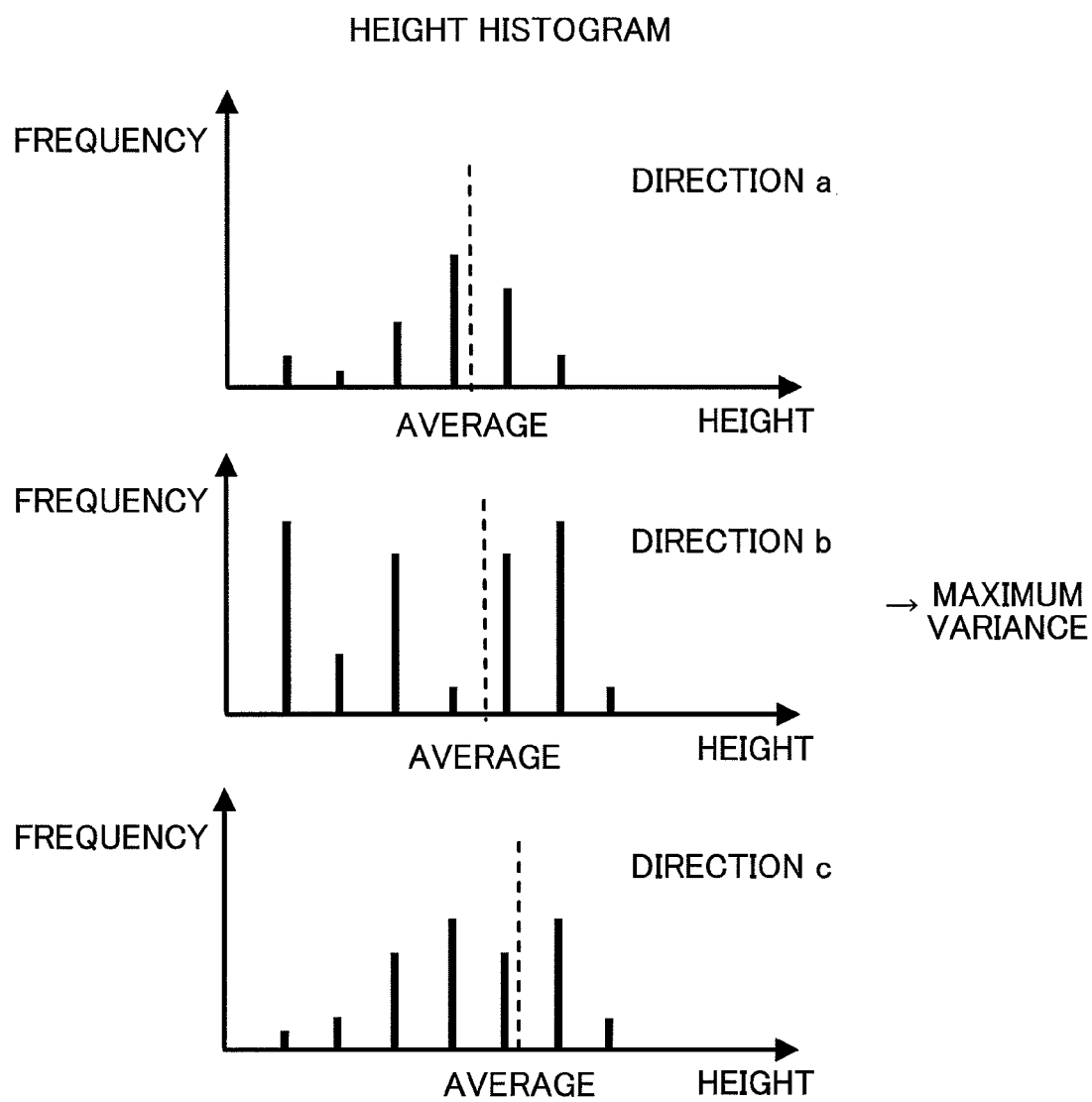
Figure 9:
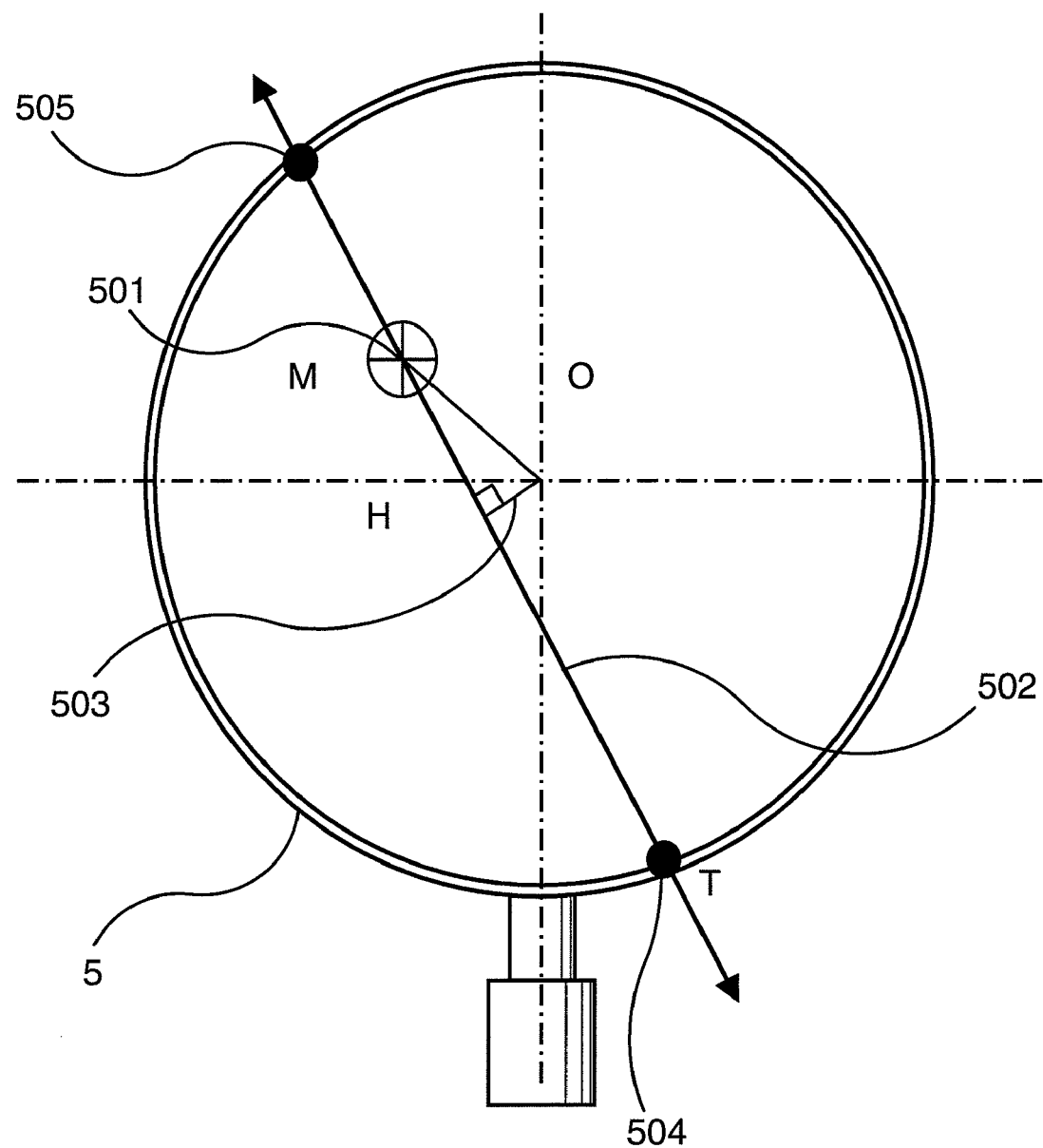
FIG. 9 is a schematic diagram showing a method for setting a movement target point in a mixing direction.

A method for specifying a mixing direction in the mountain leveling operation is described below with reference to FIGS. 4, 6 to 9. FIG. 6 is a schematic diagram of the cooking container when viewed in the direction perpendicular to the cooking surface of the cooking container, FIGS. 7 are graphs showing cross-sectional shapes along directions "a", "b" and "c" of FIG. 6, FIGS. 8 are histograms showing distributions with respect to average heights for the cross-sectional shapes of FIGS. 7, and FIG. 9 is a schematic diagram showing a method for setting a movement target point in a mixing direction.

With reference to FIGS. 4, 6 to 9, a maximum height position of the ingredients 6 in the cooking container 5 is extracted and set as an operation starting point (Step S24) if the maximum height is equal to or larger than the second threshold value.

Subsequently, cross-sectional shapes (see FIGS. 7) of the heights of the ingredients 6 in a plurality planes (virtual vertical planes) set at specified angles about an axis passing the maximum height position of the ingredients 6 and vertical to the cooking surface of the cooking container 5 are extracted (Step S25).

Specifically, the cross-sectional shapes of the ingredients 6 in the virtual vertical planes extending in the directions "a", "b" and "c" of FIG. 6 are shown in FIGS. 7. As can be understood from FIGS. 7, the direction "a" constantly passes the ingredients 6. The direction "b" passes a range where the ingredients 6 are absent after moving a specified distance from the operation starting point, but passes again a range where the ingredients 6 are present. The direction "c" constantly passes a range where the ingredients 6 are absent from a position slightly distanced from the operation starting point. In the case of these directions "a", "b" and "c", the variance of the height of the ingredients 6 with respect to the average height is understood to be largest in the direction "b" as shown in FIGS. 8. In this embodiment, if D denotes the diameter of the cooking container 5, only variations of wavelengths, which are about 1/10 D to 2 D, are considered out of cross-sectional waveforms shown in FIG. 7. This is because the shapes of the ingredients themselves are also influenced if wavelengths shorter than those are considered.

A cross-sectional direction with the maximum variation of the height distribution (direction "b" in the above example) is set as the mixing direction (Step S26).

The movement target point in the mixing direction is set as follows. Specifically, as shown in FIG. 9, out of intersections 504, 505 of a mixing direction 502 and the inner wall of the cooking container 5 when the cooking surface of the cooking container 5 is viewed in a direction orthogonal to the cooking surface, the one more distant from an operation starting point 501, i.e. the intersection 504 is set as the movement target point of the mixer 4 (Step S27). More specifically, the intersection 504 belonging to a section, where a foot 503 of a perpendicular from the center of the cooking container 5 to the mixing direction 502 is located, out of two sections of the mixing direction 502 at the opposite sides of the operation starting point 501 is set as the movement target point.

Subsequently, the mixer 4 is inserted to the operation starting point obtained in Step S27 by the mixer driving unit 2 (Step S28). Subsequently, abnormal states of the mixer 4 and the ingredients 6 are monitored by the abnormality detector 104 (Step S29).

Here, if an abnormal state (error) is judged (YES in Step S30), this abnormal state is specified. Then, an error recovering operation for the specified abnormal state is performed (Step S32) and, then, step S33 follows. On the other hand, if no abnormal state is judged (NO in Step S30), the mixer 4 is moved toward the movement target point set in Step S27 (Step S31). Specifically, a moving distance of the mixer 4 can be, for example, set to 1/10 of a distance between the operation starting point and the movement target point. Here, the mixer 4 is moved in the mixing direction while being inclined (e.g. by 60°) so that a part of the mixer 4 more distant from the cooking container 5 moves ahead in the mixing direction. By doing so, different from the case where the ingredients 6 are moved while scooping up the ingredients 6 from below, the mixer 4 can be moved while pressing the ingredients 6 by an intermediate portion thereof. Therefore, the spill-out of the ingredients 6 from the cooking container 5 can be suppressed. For mixing the ingredients 6 present one above another evenly, the mountain leveling operation 202 can be performed with the leading end of the mixer 4 kept at a specified distance from the cooking surface of the cooking container 5. In this way, the ingredients distant from the cooking surface of the cooking container 5 and those close thereto are successively switched and the heat of the cooking container 5 can be more evenly transferred to the ingredients 6.

Subsequently, it is judged whether or not a specified range from the movement target point has been reached as a result of the mixing operation (Step S33), and this routine returns to the abnormal state detecting step (Step S29) for the mixer 4 and the ingredients 6 if the specified range has not been reached yet.

On the other hand, mixing completion judgment is made (Step S34) if the mixer 4 is judged to have reached the specified range from the center of the cooking container 5. Specifically, the value of the elapsed time timer 108 and the value of the operation time specified by the user are compared, and the mixing is judged to have been completed (Step S35) if these values match.

Here, if the value of the elapsed time timer 108 lies in the operation time range specified by the user (NO in Step S35), the mixing is judged not to have been completed yet and this routine returns to the ingredient height distribution measuring step (Step S22).

On the other hand, if the mixing is judged to have been completed (YES in Step S35), the completion of the mixing is notified to the user using specified means (Step S20) similar to the mountain making operation 201 and the operation is stopped.

Although the value of the elapsed time timer 108 and the operation time specified by the user are compared to judge whether or not the mixing has been completed in this embodiment, another judging condition to judge the completion of the mixing may be adopted. Other judging conditions include a case where the output of the mixed state detector 101 indicates a sufficiently mixed state, a case where the color of the ingredients picked up by an image pickup camera lies in a specified color range, a case where the value of reaction force detected by the force detector 25 when a skewer is stuck into the ingredients 6 using the mixer driving unit 2 exceeds a specified threshold value, and other cases.

In this embodiment, the mixing operation is performed on a straight line passing the maximum height of the ingredients 6. However, the mixing operation is not limited to this if sufficient measure is taken to realize a complicated control and to prevent the ingredients 6 from spilling out of the cooking container. For example, it may be thought to set a spiral direction about the maximum height of the ingredients 6 as the mixing direction. It is also thought to perform the mixing operation by inserting the mixer 4 into the ingredients 6 and rotating it while inclining it with respect to the cooking surface of the cooking container 5.

Second Embodiment

Next, a cooking assistance robot according to a second embodiment of the present invention is described.

The cooking assistance robot according to the second embodiment of the present invention is for heat cooking by evenly mixing ingredients while reducing the burning and shape loss of the ingredients. Specifically, the cooking assistance robot according to this embodiment measures a temperature distribution of the ingredients by a temperature distribution measuring unit 310 and changes the position and posture of a mixer according to the temperature distribution of the ingredients by a mixer driving unit.

Since the construction of the second embodiment of the present invention is similar to that of the first embodiment except contents of controls in a control unit, it is not described in detail.

Figure 14A:
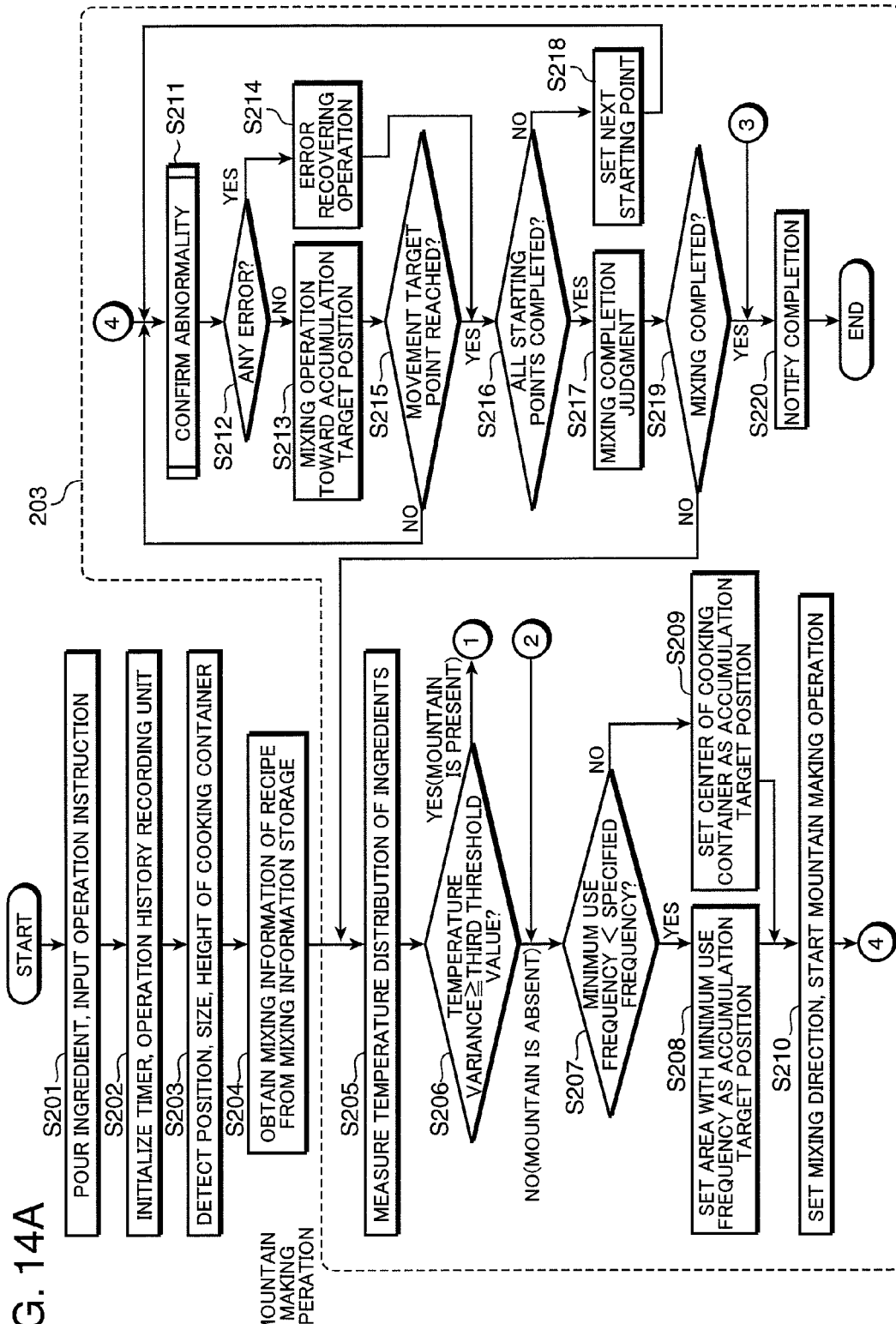
FIG. 14A and FIG. 14B are flow charts showing processing steps of a cooking assistance robot according to a second embodiment of the invention.
Figure 14B:
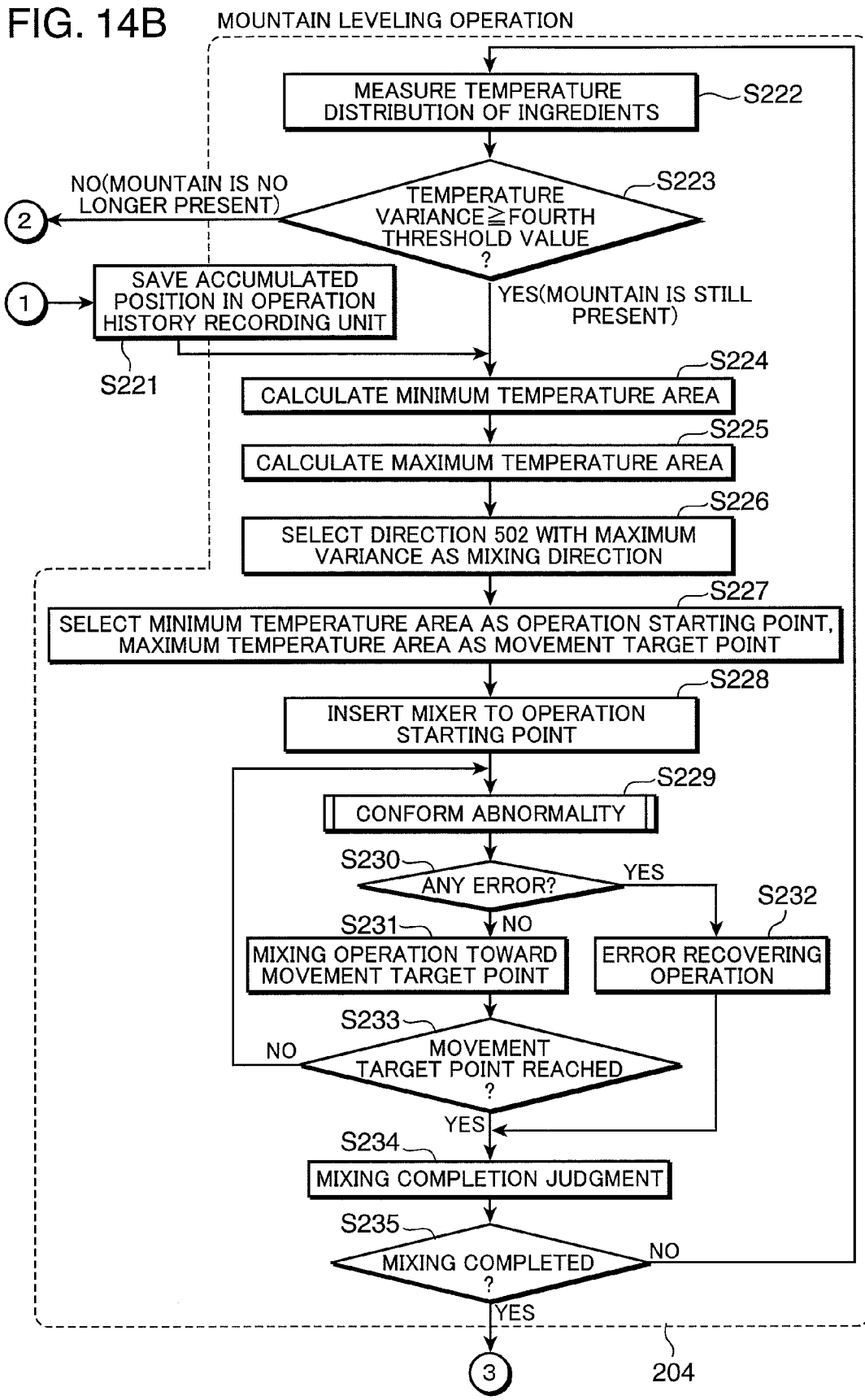

Next, the operation of the cooking assistance robot 1 according to the second embodiment is described. FIG. 14A and FIG. 14B are flow charts showing processing steps of the cooking assistance robot 1 according to the second embodiment of the present invention.

An outline of a basic operation is to perform the mixing operation while alternately repeating a mountain making operation 203 and a mountain leveling operation 204 after various initializations.

First of all, the cooking assistance robot 1 waits on standby until an instruction of a user is inputted, i.e. waits until it is completed by the user to turn a cooking heating stove 8 on, to pour ingredients 6 and to input an operation instruction (Step S201).

If the user inputs an operation start by specifying a cooking recipe or ingredients to be used, used amount of the ingredients and an operation time using the operation unit 27, an elapsed time timer 108 and an operation history recording unit 405 are initialized (Step S202). Subsequently, the position and the size of a cooking container 5 and the height of the peripheral edge thereof are measured (Step S203).

Subsequently, an operation parameter corresponding to the cooking recipe or the type of the ingredients 6, the used amount of the ingredients 6 and the operation time specified by the user is obtained from a mixing information storage 105 and set in an operation instructing unit 107 (Step S204), and then processing steps of the mountain making operation 203 follows.

In the mountain making operation 203, the temperature distribution of the ingredients 6 in the cooking container 5 is measured using the temperature distribution measuring unit 310 based on the position and size of the cooking container 5 detected in Step S202 (Step S205). If a variance of the temperature distribution is equal to or larger than a third threshold value of a mixing operation judging condition in the mixing operation parameter obtained in Step S204 (YES in Step S206), it is judged that a mountain is already present (mountain making operation is completed) and the present accumulated position of the ingredients 6 is recorded in the operation history recording unit 405 (Step S221) and next Step S224 follows.

Here, the third threshold value used is the value obtained in Step S204.

On the other hand, if the variance of the temperature distribution is below the third threshold value (NO in Step S206), a position with a lowest use frequency out of the use frequencies of the cooking surface of the cooking container 5 stored in the operation history recording unit 405 is read. In addition, it is judged whether or not this use frequency is below a preset use frequency (Step S207). Here, if the use frequency is below the preset use frequency, the position with the lowest use frequency is set as an accumulation target position for making a mountain of the ingredients 6 (Step S208). On the other hand, if the use frequency exceeds the preset frequency in the entire area of the cooking container 5, the center of the cooking container 5 is set as the accumulation target position (Step S209).

Subsequently, a mixing direction for making the mountain of the ingredients 6 is set and the mountain making operation is started (Step S210).

Subsequently, the mixer 4 is so inserted to the operation starting point obtained in Step S210 as to be perpendicular to the cooking surface of the cooking container 5.

Subsequently, abnormal states of the mixer 4 and the ingredients 6 are monitored by an abnormality detector 104 (Step S211). If an abnormal state (error) is detected (YES in Step S212), it is specified. An error recovering operation for the specified abnormal state is performed (Step S214), then a specified mixing operation completion confirming step S216 follows.

On the other hand, if no abnormal state is judged (NO in Step S212), a movement of the mixer 4 toward the accumulation target position is started by the mixer driving unit 2 (Step S213).

Subsequently, it is judged whether or not the mixer 4 has reached a specified range from the accumulation target position as a result of the mixing operation (Step S215). This routine returns to the abnormal state detecting step (S211) for the mixer 4 and the ingredients 6 unless the specified range is not reached yet.

On the other hand, if the mixer 4 has reached the specified range from the accumulation target position (YES in Step S215), it is judged whether or not any one of the operation starting points set in Step S210 has not been selected yet (Step S216). Here, if there are unselected operation starting points (NO in Step S216), an arbitrary point is selected from the unselected operation starting points and set as the next operation starting point (Step S218).

If there is no unselected operation starting point (YES in Step S216), mixing completion judgment (Step S217) is made. Here, the value of the elapsed time timer 108 and the value of the operation time specified by the user are compared and the mixing is judged to have been completed (Step S219) if these values match.

If the value of the elapsed time timer 108 lies in the operation time range specified by the user (NO in Step S219), the mixing is judged not to have been completed yet and this routine returns to the temperature distribution measuring step (Step S205).

On the other hand, if the mixing is judged to have been completed (YES in Step S219), the completion of the mixing is notified to the user using specified means if necessary and the operation is stopped (Step S220).

Next, processing steps of the mountain leveling operation 204 are described.

First of all, similar to the mountain making operation 203, the temperature distribution of the ingredients 6 in the cooking container 5 is measured using the temperature distribution measuring unit 310 based on the position and size of the cooking container 5 detected in Step S203 (Step S222). Subsequently, it is judged whether or not a variance of the temperature distribution measured by the temperature distribution measuring unit 310 is equal to or larger than a fourth threshold value of the mixing operation judging condition in the mixing operation parameter obtained in Step S204 (Step S223). Here, if the variance of the temperature distribution is smaller than the fourth threshold value here (NO in Step S223), it is judged that the mountain has been completely leveled and Step S207 of the above mountain making operation 203 follows.

Subsequently, a minimum temperature area of the ingredients 6 in the cooking container 5 is calculated (Step S224) if the variance of the temperature distribution is equal to or larger than the fourth threshold value. In addition, a maximum temperature area of the ingredients 6 in the cooking container 5 is calculated (Step S225).

Subsequently, a cross-sectional direction with a maximum variance of the temperature distribution is set as the mixing direction (Step S226).

A movement target point in the mixing direction is set as follows. Specifically, out of the selected cross section, the minimum temperature area of the ingredients 6 is set as an operation starting point. In addition, out of the selected cross section, the maximum temperature area of the ingredients 6 is set as a movement target point (Step S227).

Subsequently, the mixer 4 is inserted to the operation starting point obtained in Step S227 by the mixer driving unit 2 (Step S228). Subsequently, abnormal states of the mixer 4 and the ingredients 6 are monitored by the abnormality detector 104 (Step S229).

Here, if an abnormal state (error) is judged (YES in Step S230), this abnormal state is specified. Then, an error recovering operation for the specified abnormal state is performed (Step S232) and, then, mixing completion judging step S234 follows. On the other hand, if no abnormal state is judged (NO in Step S230), the mixer 4 is moved toward the movement target point set in Step S227 (Step S231).

Subsequently, it is judged whether or not a specified range from the movement target point has been reached as a result of the mixing operation (Step S233), and this routine returns to the abnormal state detecting step (Step S229) for the mixer 4 and the ingredients 6 if the specified range has not been reached yet.

On the other hand, mixing completion judgment is made (Step S234) if the mixer 4 is judged to have reached the specified range from the center of the cooking container 5. Specifically, the value of the elapsed time timer 108 and the value of the operation time specified by the user are compared, and the mixing is judged to have been completed (Step S235) if these values match.

Here, if the value of the elapsed time timer 108 lies in the operation time range specified by the user (NO in Step S235), the mixing is judged not to have been completed yet and this routine returns to the ingredient height distribution measuring step (Step S222).

On the other hand, if the mixing is judged to have been completed (YES in Step S235), the completion of the mixing is notified to the user using specified means (Step S220) similar to the mountain making operation 203 and the operation is stopped.

Third Embodiment

Next, a cooking assistance robot according to a third embodiment of the present invention is described.

The cooking assistance robot according to the third embodiment of the present invention is for heat cooking by evenly mixing ingredients while reducing the burning and shape loss of the ingredients. Specifically, the cooking assistance robot according to this embodiment measures a height distribution of the ingredients by a height distribution measuring unit and a temperature distribution of the ingredients by a temperature distribution measuring unit. The positions and postures of a mixer and a cooking container are changed according to the height distribution and temperature distribution of the ingredients by a mixer/cooking container driving unit based on these measurement results.

In the third embodiment of the present invention are provided means for changing the position and posture of the mixer while holding it and means for measuring the height distribution and temperature distribution of the ingredients. The cooking assistance robot for regulating the mixing operation according to the height distribution and temperature distribution of the ingredients is described as an embodiment.

Hereinafter, the construction of the third embodiment is described with reference to the corresponding drawings. Parts similar to the first embodiment of the present invention are identified by the same reference numerals and are not described in detail.

Figure 10:
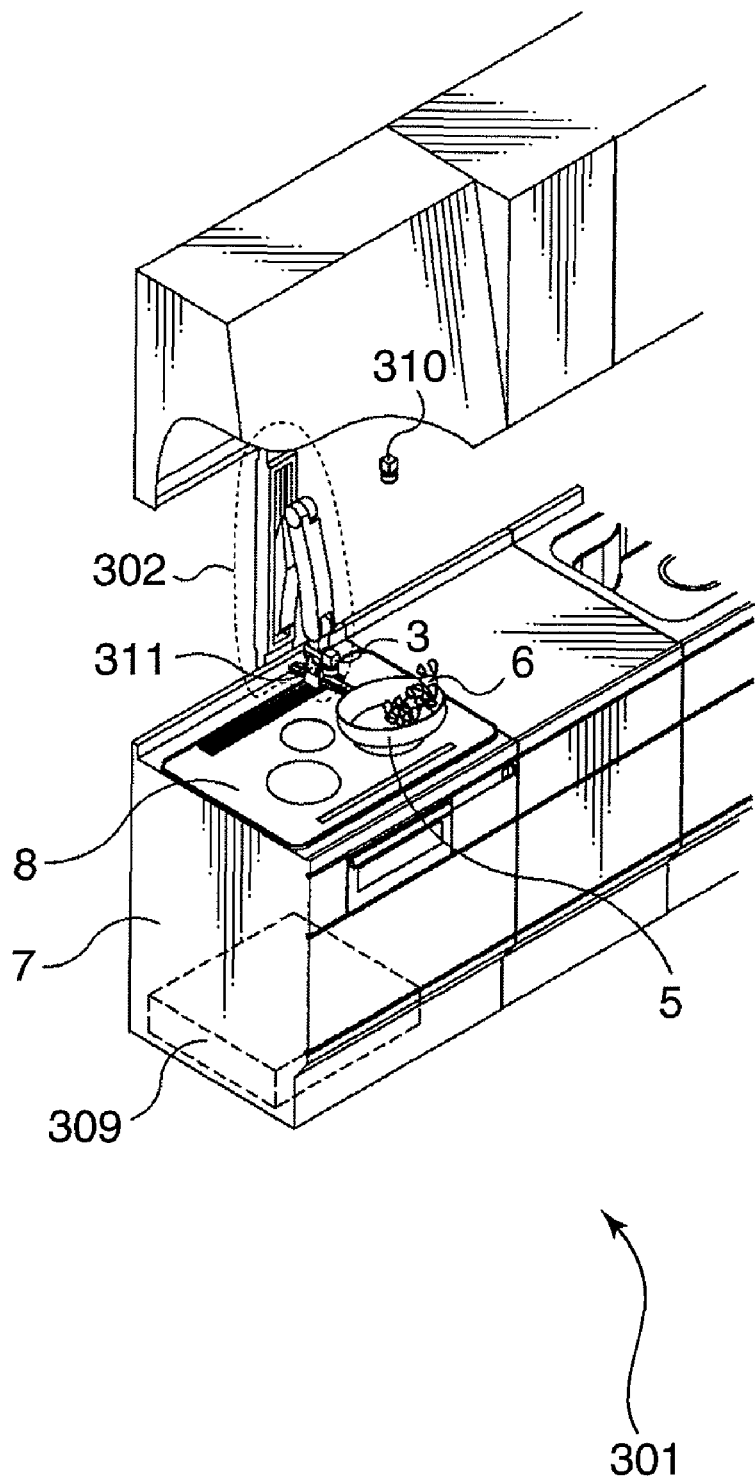
FIG. 10 is a diagram outlining a cooking assistance robot according to a third embodiment of the invention.

FIG. 10 is a diagram outlining the cooking assistance robot according to the third embodiment of the present invention.

The cooking assistance robot 301 according to the third embodiment of the present invention differs from the cooking assistance robot 1 according to the first embodiment of the present invention in the following three points. The first point is to further include a sound collector 311 for recording sounds given during the mixing operation. The second point is to include a mixer/cooking container driving unit 302 for changing the positions and postures of a mixer 4 and a cooking container 5 instead of the mixer driving unit 2. The third point is to include a control unit 309 for controlling the cooking assistance robot 301 also utilizing output results of the temperature distribution measuring unit 310, the sound collector 311 and the mixer/cooking container driving unit 302 instead of the control unit 9.

The mixer/cooking container driving unit 302 includes a hand structure capable of holding the cooking container 5 to change the position and posture of the cooking container 5 and a portable weight performance in addition to the mixer driving unit 2 of the cooking assistance robot 1 according to the first embodiment of the present invention.

The temperature distribution measuring unit 310 is fixed above a heating area (not shown) of a cooking heating stove 8 for measuring a distribution of the surface temperature of ingredients 6 in the cooking container 5 in a non-contact manner.

Since the temperature distributions of the cooking container 5 and the ingredients 6 can be measured by this temperature distribution measuring unit 310, the heat of the cooking container 5 can be effectively utilized. In other words, it is possible to perform the mixing operation in such a manner as to increase a contact area of insufficiently heated parts of the ingredients 6 with the cooking container 5 and to actively utilize an area of the cooking container 5 with high average temperature.

A general far-infrared camera for outputting the quantity of far infrared rays irradiated from an object as color density can be, for example, used as the temperature distribution measuring unit 310. It is also possible to attach a contact-type temperature sensor to a hand portion 24 of the mixer driving unit 2. In this case, the contact with the ingredients 6 and the temperature measurement of the cooking container 5 are repeatedly and intermittently performed by causing the temperature sensor to scan a measurement area according to a movement of the hand portion 24. In this way, the temperature distribution of the entire area of the cooking container 5 can be measured. Further, this temperature sensor may be built in the leading end of the mixer 4 to transmit temperature information.

Although the temperature distribution measuring unit 310 is fixed above the heating area of the cooking heating stove 8 in the third embodiment of the present invention, it may be installed in an arm portion or a hand portion of the mixer/cooking container driving unit 302 similar to the height distribution measuring unit 3 unless it is necessary to constantly measure the temperature distribution at one position.

The sound collector 311 records sounds given during the mixing operation.

Thus, if an excessive external force is detected by a force detector 25, whether such a force results from a state where the mixer collides with the inner wall of the cooking container or a state where the ingredients 6 are squeezed between the cooking container 5 and the mixer 4 can be distinguished based on the intensity of frequency components included in the sounds.

A general moving-coil microphone, a capacitor microphone, a piezoelectric microphone or the like can be used as the sound collector 311.

The temperature distribution measuring unit 310 and the sound collector 311 of the present invention are attached to a hand portion 24 in consideration of being incorporated into an existing cooking system. However, it is sufficient to be able to measure the temperature distribution of the ingredients 6 in the cooking container 5, and they may be fixed to another movable or fixed part, e.g. to the cooking heating stove 8.

Figure 11:
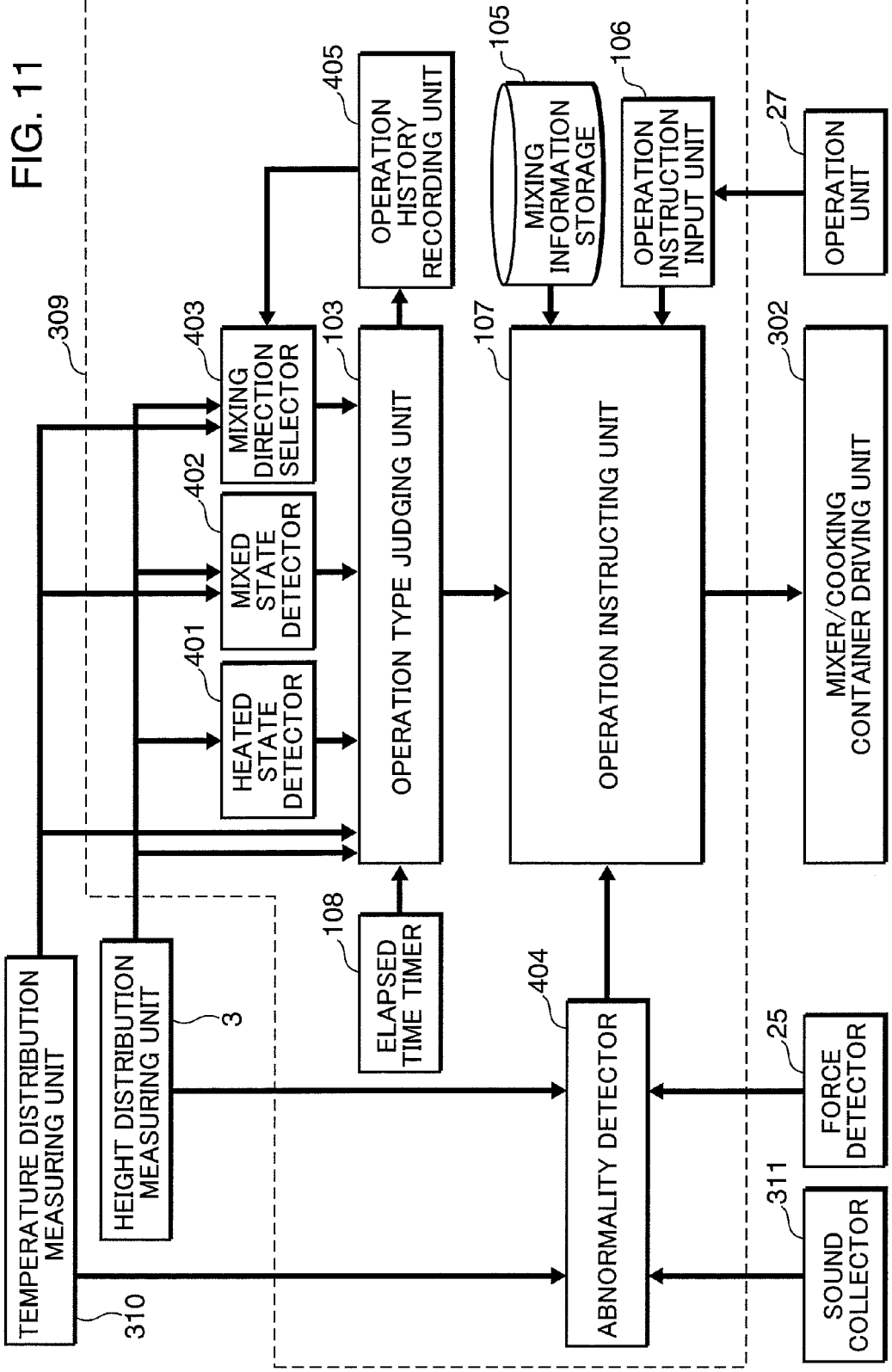
FIG. 11 is a block diagram showing the electrical construction of the cooking assistance robot of FIG. 10, FIG. 12A and FIG. 12B are flow charts showing processing steps of the cooking assistance robot of FIG. 10.

FIG. 11 is a block diagram showing the construction of the cooking assistance robot 301 according to the third embodiment of the present invention.

The cooking assistance robot 301 according to the third embodiment of the present invention differs from the cooking assistance robot 1 according to the first embodiment of the present invention in that the control unit 309 further includes a heated state detector 401 for detecting a heated state of the ingredients using the output result of the temperature distribution measuring unit 310, a mixed state detector 402 for detecting a mixed state of the ingredients using the output results of the temperature distribution measuring unit 310 and the height distribution measuring unit 3, a mixing direction selector 403 for selecting a mixing direction using the output results of the temperature distribution measuring unit 310 and the height distribution measuring unit 3, and an abnormality detector 404 for detecting an abnormal state from the output results of the temperature distribution measuring unit 310, the height distribution measuring unit 3, the sound collector 311 and the force detector 25.

The heated state detector 401 judges that the ingredients 6 are unevenly heated if a variance of the temperature distribution in the cooking container 5 measured by the temperature distribution measuring unit 310 is equal to or above a specified threshold value. Further, by extracting a small area with a minimum temperature of the temperature distribution, a part of the ingredients 6 most insufficiently heated is extracted.

The ingredients 6 can be more evenly heated by performing the mixing operation in such a manner as to increase a contact area of the insufficiently heated part of the ingredients 6 and the cooking container 5.

Further, by extracting a small area with a maximum temperature, an area with a largest heat quantity can be extracted. This enables the effective utilization of the heat of the cooking container 5 and the cooking heating stove 8 by actively utilizing the small area with high average temperature.

The mixed state detector 402 calculates a maximum height area, a minimum height area, a height variance, a maximum temperature area, a minimum temperature area and a temperature variance of the ingredients 6 in the cooking container 5 based on the output results of the height distribution measuring unit 3 and the temperature distribution measuring unit 310. Further, the mixed state detector 402 judges that the ingredients 6 are insufficiently mixed if both or either one of the height variance and the temperature variance is equal to or above a predetermined threshold value. The mixed state detector 402 also judges the maximum height area or the minimum temperature area as a part of the ingredients 6 with low temperature and the minimum height area or the maximum temperature area as a part of the ingredients 6 with high temperature, and outputs the result.

An operation history recording unit 405 records a history of performed mixing operations. The cooking surface of the cooking container 5 is divided into small areas, the presence of the ingredients 6 in the respective areas is detected using the height distribution measuring unit 3 or the temperature distribution measuring unit 310, and presence times are cumulatively recorded. In this way, the use frequencies of the respective small areas can be calculated.

At the time of a mountain making operation, the mixing direction selector 403 determines the next mountain making target position of the ingredients 6 using the use frequencies of the above respective small areas recorded in the operation history recording unit 405 and selects a moving direction of the mixer 4 for accumulating the ingredients 6 to the target position. At the time of a mountain leveling operation, the mixing direction selector 403 determines a starting position and a target position of the mountain leveling operation from the output result of the temperature distribution measuring unit 310 and selects a moving direction of the mixer 4 to disperse the ingredients 6. Although only the temperature distribution is used in selecting the moving direction of the mountain leveling operation in this embodiment, it is also possible to use the measurement result of the height distribution measuring unit 3 or to use the measurement results of both the height distribution measuring unit 3 and the temperature distribution measuring unit 310.

The abnormality detector 404 detects an abnormal state based on the output results from the height distribution measuring unit 3, the temperature distribution measuring unit 310, the force detector 25 and the sound collector 311 and notifies the abnormal state to an operation instructing unit 107. Specifically, the abnormality detector 404 detects a state where the ingredients 6 are about to spill out of the cooking container 5 based on the result of the height distribution measuring unit 3. Further, the abnormality detector 404 detects the presence of an excessively hot part from the output result of the temperature distribution measuring unit 310.

Furthermore, the abnormality detector 404 discriminates a state where the mixer 4 is in contact with the cooking container 5, a state where the ingredients 6 are squeezed between the mixer 4 and the cooking container 5 or a state where the mixer 4 is in contact with a user based on the result of the force detector 25. Specifically, the abnormality detector 404 frequency-analyzes (e.g. Fourier transform) sound information from a preceding specified period recorded by the sound collector 311 upon the detection of the action of an external force equal to or larger than a predetermined threshold value on the mixer 4, and discriminates whether or not the mixer 4 is in contact with the cooking container 5 based on whether the intensity and content of frequency components near the natural frequency of the cooking container 5 out of frequency components of the sound information are below predetermined threshold values.

The respective functions of the heated state detector 401, the mixed state detector 402 and the mixing direction selector 403 of the control unit 309, an elapsed time timer 108, an operation type judging unit 103, the operation history storage 405, the abnormality detector 404, the operation instructing unit 107, a mixing information storage 105 and an operation instruction input unit 106 may be realized by hardware such as special circuits or may be realized by being described by software and implemented in a computer.

Figure 12A:
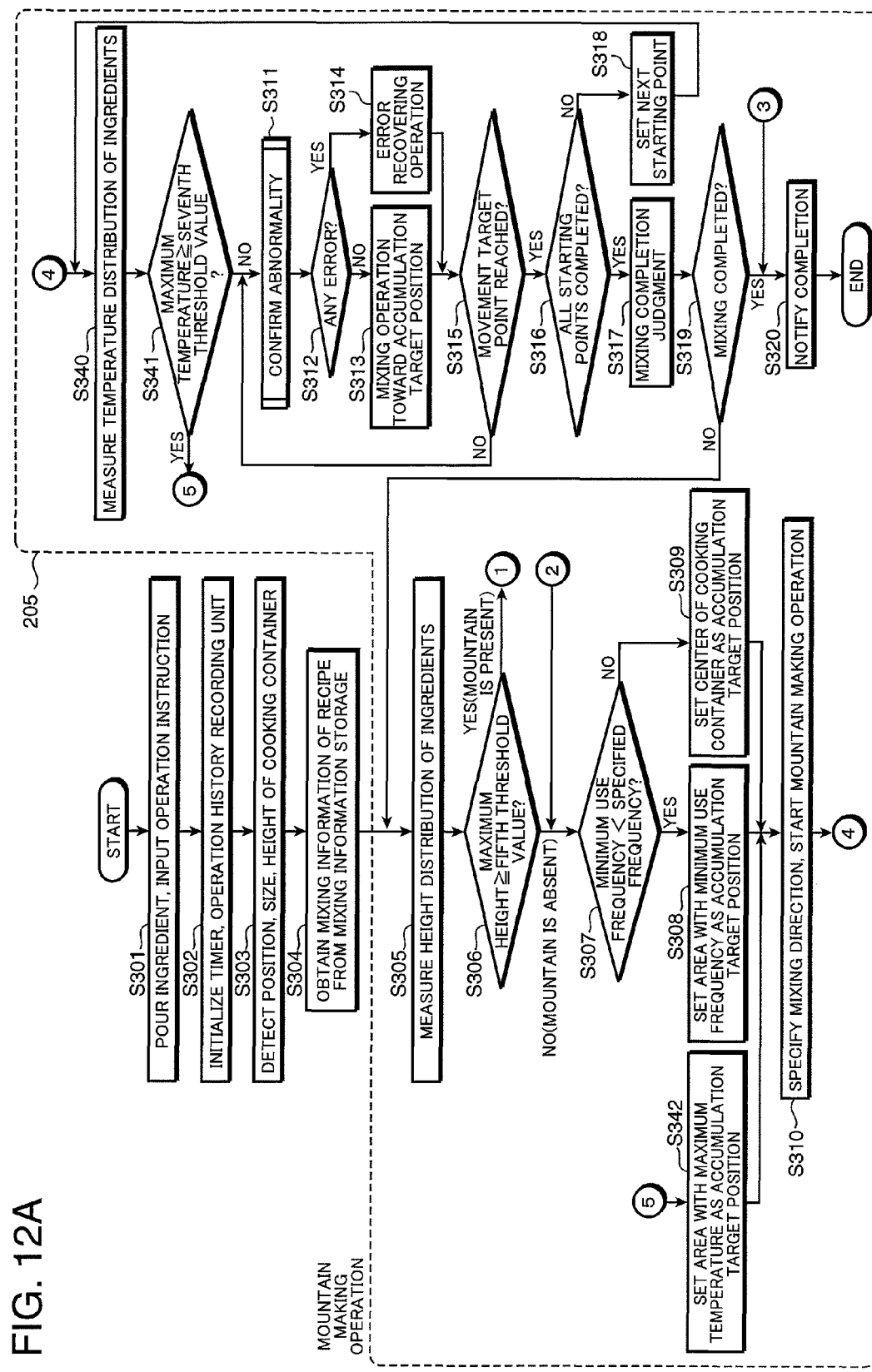

Next, the operation of the cooking assistance robot 301 according to the third embodiment of the present invention is described. FIG. 12A and FIG. 12B are flow charts showing processing steps of the cooking assistance robot 301 according to the third embodiment of the present invention.

First of all, similar to the cooking assistance robot 1 according to the first embodiment of the present invention, the cooking assistance robot 301 waits on standby until an instruction of the user is inputted, i.e. until it is completed by the user to turn a cooking heating stove 8 on, to pour ingredients 6 and to input an operation instruction (Step S301).

If the user inputs an operation start by specifying a cooking recipe or ingredients to be used, used amount of the ingredients and an operation time using an operation unit 27, the elapsed time timer 108 and the operation history recording unit 405 are initialized (Step S302). Subsequently, the position and size of the cooking container 5 and the height of the peripheral edge thereof are measured (Step S303).

Subsequently, an operation parameter corresponding to the cooking recipe or the type of the ingredients 6, the used amount of the ingredients 6 and the operation time specified by the user is obtained from the mixing information storage 105 and set in the operation instructing unit 107 (Step S304), and then processing steps of a mountain making operation 205 follows.

In the mountain making operation 205, the height distribution of the ingredients 6 in the cooking container 5 is measured using the height distribution measuring unit 3 based on the position and size of the cooking container 5 detected in Step S302 (Step S305). If a maximum height of the height distribution is equal to or larger than a fifth threshold value of a mixing operation judging condition in the mixing operation parameter obtained in Step S304 (YES in Step S306), it is judged that a mountain is already present (mountain making operation is completed) and the present accumulated position of the ingredients 6 is recorded in the operation history recording unit 405 (Step S321) and next Step S324 follows.

On the other hand, if the maximum height of the height distribution is below the fifth threshold value (NO in Step S306), a position of the cooking surface of the cooking container 5 with a lowest use frequency recorded in the operation history recording unit 405 is read. In addition, it is judged whether or not this use frequency is below a preset use frequency (Step S307). Here, if the used frequency is below the preset use frequency, the position with the lowest use frequency is set as an accumulation target position for making a mountain of the ingredients 6 (Step S308). On the other hand, if the use frequency exceeds the preset frequency, the center of the cooking container 5 is set as the accumulation target position (Step S309).

Subsequently, a mixing direction for making the mountain of the ingredients 6 is set and the mountain making operation is started by the mixer/cooking container driving unit 302 (Step S310).

Subsequently, the temperature distribution of the surface of the ingredients 6 is measured using the temperature distribution measuring unit 310 (Step S340). It is then judged whether or not a maximum temperature of the surface temperature of the ingredients 6 is equal to or above a seventh threshold value (Step S341). If the maximum temperature of the surface temperature of the ingredients 6 is equal to or above the seventh threshold value (YES in Step S341), a maximum temperature area is set as the accumulation target position in order to effectively utilize heat from the cooking surface of the cooking container 5 (Step S342) and the mountain making operation in Step S310 is resumed. On the other hand, if the maximum temperature of the surface temperature of the ingredients 6 is below the seventh threshold value (NO in Step S341), the abnormality detector 404 monitors abnormal states of the mixer 4 and the ingredients 6 to be described later (Step S311). If the abnormal state is judged (YES in Step S312), this abnormal state is specified. Then, an error recovering operation for the specified abnormal state is performed (Step S314) and, then, mixing completion judging step S315 follows. On the other hand, if no abnormal state is judged (NO in Step S312), the mixer 4 is moved toward the accumulation target position set in Steps S308, S309 or S342.

Subsequently, it is judged whether or not a specified range from the accumulation target position has been reached as a result of the mixing operation (Step S315), and this routine returns to the abnormal state detecting step (Step S311) for the mixer 4 and the ingredients 6 if the specified range has not been reached yet.

On the other hand, if the mixer 4 is judged to have reached the specified range from the accumulation target position of the cooking container 5 (YES in Step S315), it is judged whether or not any one of the operation starting points set in Step S310 has not been selected yet (Step S316). Here, if there are unselected operation starting points (NO in Step S316), an arbitrary point is selected from the unselected operation starting points and set as the next operation starting point (Step S318). A method for selecting a point of division adjacent to the one where the mixing operation was already completed, a method for selecting a point of division with a maximum average height of the ingredients 6 located in the vicinity out of unselected operation starting points, or the like can be, for example, cited as a method for selecting the next operation starting point.

If there is no more unselected point of division (YES in Step S316), mixing completion judgment (Step S317) is made. Here, the value of the elapsed time timer 108 and the value of the operation time specified by the user are compared and the mixing is judged to have been completed (Step S319) if these values match.

If the value of the elapsed time timer 108 lies in the operation time range specified by the user (NO in Step S319), the mixing is judged not to have been completed yet and this routine returns to Step S305, judging that the mixing has not been completed yet.

On the other hand, if the mixing is judged to have been completed (YES in Step S319), the completion of the mixing is notified to the user using specified means and the operation is stopped (Step S320). General notification means such as means for outputting sound to the outside or light blinking means can be used as the specified means.

Next, processing steps of a mountain leveling operation 206 are described.

First of all, similar to the mountain making operation 205, a height distribution of the ingredients 6 in the cooking container 5 from the cooking surface of the cooling container 5 is measured using the height distribution measuring unit 3 based on the position and size of the cooking container 5 detected in Step S303 (Step S322). Subsequently, it is judged whether or not a maximum height of the height distribution measured by the height distribution measuring unit 3 is equal to or larger than a sixth threshold value of a mixing operation judging condition in the mixing operation parameter obtained in Step S304 (Step S323). Here, if the maximum height is smaller than the sixth threshold value (NO in Step S323), it is judged that the mountain has been completely leveled and Step S307 of the above mountain making operation 205 follows.

On the other hand, a maximum height position of the ingredients 6 in the cooking container 5 is extracted and set as an operation starting point (Step S324) if the maximum height is equal to or larger than the sixth threshold value of the mixing operation judging condition (YES in Step S323).

Subsequently, height cross-sectional shapes of the ingredients 6 in a plurality planes (virtual vertical planes) set at specified angles about an axis passing the maximum height position of the ingredients 6 and vertical to the cooking surface of the cooking container 5 are extracted (Step S325).

Subsequently, a surface temperature distribution of the ingredients 6 in the cooking container 5 is measured (Step S326).

Subsequently, it is judged whether the maximum temperature of the surface of the ingredients 6 is equal to or above a seventh threshold value (Step S327). If the maximum temperature of the surface of the ingredients 6 is equal to or above the seventh threshold value (YES in Step S327), a minimum temperature area is selected as an operation starting point and a maximum temperature area is selected as a movement target point (Step S329).

Subsequently, a cross-sectional direction 502 with a maximum height variance is selected as the mixing direction (Step S328) if the maximum temperature of the surface of the ingredients 6 is below the seven threshold value (NO in Step S327).

Subsequently, out of intersections 504, 505 of the mixing direction 502 and the inner wall of the cooking container 5, the one 504 at a side, where a foot 503 of a perpendicular from the center of the cooking container 5 to the mixing direction 502 is located, is selected as a movement target point (Step S330).

Subsequently, the mixer 4 is inserted to the operation starting point obtained in Step S328 or S329 (Step S331).

Subsequently, abnormal states of the mixer 4 and the ingredients 6 are monitored by the abnormality detector 404 (Step S332). If an abnormal state (error) is judged (YES in Step S333), this abnormal state is specified. Then, an error recovering operation for the specified abnormal state is performed (Step S335) and, then, mixing completion judging step S336 follows. On the other hand, if no abnormal state is judged (NO in Step S333), the mixer 4 is moved toward the movement target point set in Step S329 or Step S330 (Step S334).

Subsequently, mixing completion judgment is made (Step S337). Here, the value of the elapsed time timer 108 and the value of the operation time specified by the user are compared and the mixing is judged to have been completed (Step S338) if these values match. If the value of the elapsed time timer 108 lies in the operation time range specified by the user (NO in Step S338), the mixing is judged not to have been completed yet and this routine returns to the ingredient height distribution measuring step (S322).

On the other hand, if the mixing is judged to have been completed (YES in Step S338), the completion of the mixing is notified to the user similar to the mountain making operation 205 and the operation is stopped (Step S320).

Although the value of the elapsed time timer 108 and the operation time specified by the user are compared to judge whether or not the mixing has been completed in this embodiment, it may be also thought to judge whether or not the temperature distribution of the ingredients 6 measured by the temperature distribution measuring unit 310 exceeds a preset value.

It can also be thought to make the mixing completion judgment by comparing sound prerecorded as the sound after the completion of the mixing by the sound collector 311 and sound collected at the present point of time.

Further, although the range of the cooking surface of the cooking container 5 with the minimum use frequency is set as the accumulation target position of the mountain making operation in this embodiment, a position inside the cooking container 5 with the maximum temperature can also be set as the accumulation target position.

In this embodiment, the part of the cooking surface of the cooking container 5 with the minimum use frequency is set as the accumulation target position for making the mountain and the direction connecting this accumulation target position and the point of division at the peripheral edge of the cooking container 5 is set as the mixing direction. However, it is also possible to set a direction from the edge of the cooking container 5 to the accumulation target position set to pass an area with the lowest average temperature out of areas on the cooking container 5 divided by lines connecting the accumulation target position and the respective points of division as the mixing direction.

In this embodiment, the operation starting point and the movement target point are set in the cooking container 5 and the mixer 4 is moved between these points. However, it is also possible to set an inclination starting position and an inclination ending position instead and to mix by inclining the cooking container 5 such that the inclination starting position is located at a vertically upward position and the inclination ending position is located at a vertically lower position. Here, an angle of inclination of the cooking container 5 is preferably set to increase as a distance between the inclination starting position and the inclination ending position increases. The cooking container 5 is not only inclined, but also shaken in a specified cycle (e.g. 0.5 sec.) and with a specified amplitude (e.g. 10 mm). Then, if the inclination starting position and the inclination ending position are close, i.e. if the ingredients 6 are drastically unevenly distributed, the angle of inclination is small and, therefore, it can be reduced that the ingredients 6 are largely dispersed to spill out of the cooking container.

Conversely, if the inclination starting position and the inclination ending position are distant, i.e. the ingredients are moderately evenly distributed, the angle of inclination is large and, therefore, a state can be improved where the ingredients 6 do not move due to friction with the bottom surface of the cooking container 5. Although the angle of inclination of the cooking container 5 is increased as the distance between the inclination starting position and the inclination ending position increases, the cooking container 5 may be inclined only by a specified fixed angle (e.g. 15°). It is not always necessary to shake the cooking container 5.

Figure 13:
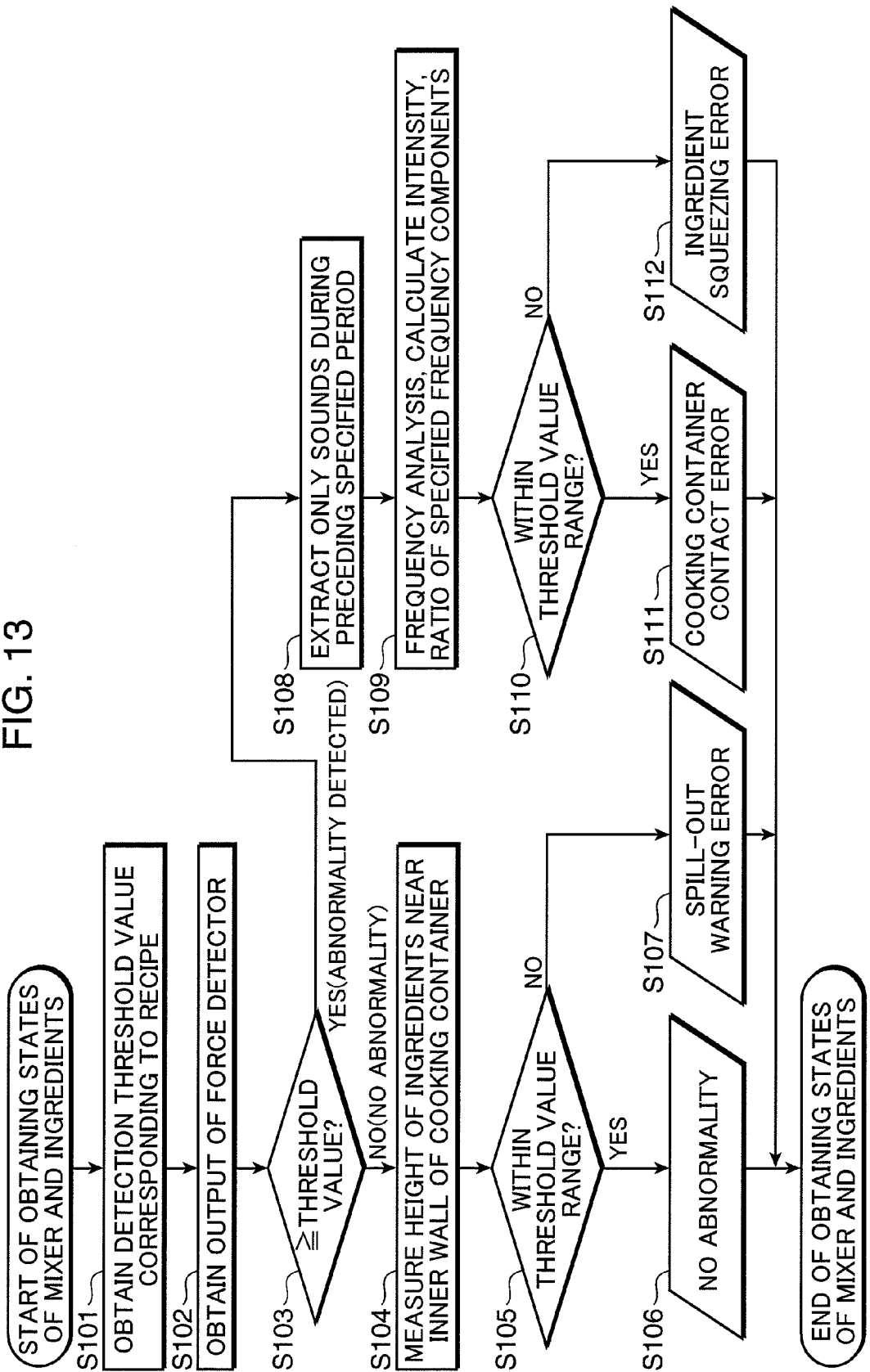
FIG. 13 is a flow chart showing error processing steps in a mixing operation of the cooking assistance robots according to the first to third embodiments of the invention in detail.

Next, the operation of detecting the abnormal state during the mixing operation is described in more detail. FIG. 13 is a flow chart showing the abnormal state detecting step during the mixing operations of the cooking assistance robots according to the first to third embodiments of the present invention.

First of all, an abnormality detection threshold value corresponding to the specified cooking recipe or type of the ingredients, used amount of the ingredients and operation time is obtained from the mixing information storage 105 (Step S101). The abnormality detection threshold value includes information used to judge the action of an abnormal external force based on the output result of the force detector 25 and information used to detect the collision of the cooking container 5 and the mixer 4. Specifically, a limit threshold value of an external force acting upon performing a mixing operation corresponding to a specific recipe, the natural frequency of the cooking container 5 or the like can be cited as the abnormality detection threshold value.

Subsequently, the output value of the force detector 25 is obtained (Step S102) and compared with the abnormality detection threshold value (Step S103).

A contact state judgment processing to be described later follows if the output value of the force detector 25 is equal to or larger than the abnormality detection threshold value (YES in Step S103), whereas a next ingredient spill-out warning judgment processing follows if the output value is below the abnormality detection threshold value (NO in Step S103).

In the ingredient spill-out warning judgment processing, the height distribution of the ingredients 6 near the peripheral edge of the cooking container 5 is measured by the height distribution measuring unit 3 (Step S104), and this height distribution is compared with a threshold value obtained by multiplying the average height of the peripheral edge of the cooking container obtained in Steps S4 or S204 described above by a specified safety factor (e.g. 0.75) (Step S105). Here, if the average height of the ingredients 6 is above the threshold value (NO in Step S105), a warning error is outputted (Step S107), judging that the ingredients 6 are about to spill out of the cooking container 5. On the other hand, if the average height of the ingredients 6 is equal to or below the threshold value (YES in Step S105), the absence of abnormality is outputted (Step S106), judging no abnormality.

In the contact state judgment processing, out of the sound information measured by the sound collector 311, recorded waveforms during a period from a point of time preceding a specified time from a detection timing of an abnormal external force by the force detector 25 to the present are extracted (Step S108). In other words, the sound information during a time interval from a timing at which the mixer 4 is thought to come into contact with an unknown object to the present is extracted.

Subsequently, a frequency analysis (e.g. Fourier transform) is performed (Step S109), and the intensity and content of frequency components near the natural frequency of the cooking container 5 are compared with a specified threshold value (Step S110). If the intensity and content of the frequency components near the natural frequency of the cooking container 5 are above the specified threshold value (NO in Step S110), a cooking container contact error is outputted (Step S111), judging that the mixer 4 came into contact with the inner wall of the cooking container 5. On the other hand, if the intensity and content of the frequency components are equal to or below the threshold value (YES in Step S110), an ingredient squeezing error is outputted (Step S112), judging that the ingredients 6 were squeezed between the cooking container 5 and the mixer 4.

The above specific embodiments mainly embrace inventions having the following constructions.

Specifically, a cooking assistance robot according to one aspect of the present invention is the one for cooking by physically moving ingredients in a cooking container and comprises a mix driving unit for performing a mixing operation of moving the ingredients; a height distribution measuring unit for measuring a height distribution of the ingredients in the cooking container; a mixing direction selector for selecting a mixing direction of the mixing operation based on the height distribution of the ingredients measured by the height distribution measuring unit; and an operation instructing unit for instructing a mixing operation corresponding to the mixing direction to the mix driving unit, wherein the mixing direction selector selects a mixing direction for leveling a mountain if the mountain of a specified height or higher is present in the cooking container.

According to the present invention, if the mountain of the specified height or higher is present in the cooking container, i.e. the ingredients are accumulated at positions distant upward from a cooking surface of the cooking container and difficult to heat, it is possible to move the ingredients to lower positions and heat them.

Thus, according to the present invention, it is possible to perform the efficient mixing, with which the ingredients in the cooking container are unlikely to be unevenly heated.

Specifically, the mixing direction selector may select a direction along a virtual vertical plane with a maximum variance with respect to the average height of the ingredients on this virtual vertical plane out of a plurality of virtual vertical planes perpendicular to the cooking surface of the cooking container and passing an apex where the height of the ingredients is largest.

According to this construction, since the mountain can be leveled in the direction in which the variance with respect to the average height is largest on the virtual vertical plane, i.e. the ingredients are most unevenly distributed, all the ingredients can be evenly heated by reducing the dispersion of the ingredients in this mixing direction.

In the cooking assistance robot, the mixing direction selector preferably sets the apex as a movement starting point and, out of two intersections where the vertical plane selected as the mixing direction and the edge of the cooking container intersect, sets the one more distant from the apex as a movement target point.

According to this construction, since the mountain can be leveled by moving the ingredients in the direction in which a distance to the edge from the apex is longer, the ingredients accumulated into the mountain can be dispersed over a wide range in the cooking container. Therefore, the ingredients can be evenly heated.

In the above cooking assistance robot, the mixing direction selector preferably selects a mixing direction for making a mountain in the cooking container if there is no mountain of the specified height or higher in the cooking container.

According to this construction, if there is no mountain of the specified height or higher in the cooking container, i.e. if the ingredients are relatively evenly dispersed in the cooking container, the ingredients in contact with the cooking surface of the cooking container and those located at the outer layer of the ingredients can be switched by temporarily making the mountain and performing the above mountain leveling operation. Therefore, the ingredients can be more evenly heated.

In the cooking assistance robot, it is preferable that an operation history recording unit for recording a history of past mixing operations is further provided; and that the mixing direction selector selects a range of the cooking surface of the cooking container with a use frequency lower than a specified value based on the history of the mixing operations, sets a target position for making a mountain in the range with the low use frequency and selects a direction from the edge of the cooking container toward the target position as the mixing direction.

According to this construction, since the mountain is made in the range with the use frequency lower than the specified value, i.e. in the rage where the heat of the cooking surface of the cooking container could not be effectively utilized yet, the heat of the cooking container can be effectively utilized. Further, since a period during which a part of the cooking container is heated more than necessary can be shortened in this construction, there is an effect of extending the life of the cooking container.

In the above cooking assistance robot, the mixing direction selector preferably selects a direction along a line segment longer than a specified length out of a plurality of line segments connecting a plurality of starting points set on the edge of the cooking container and the target position.

According to this construction, since the direction along the line segment longer than the specified length is selected as the mixing direction for making a mounting of the ingredients, it can be prevented to select a mixing direction in which the ingredients can be hardly collected by being moved only a short distance, whereby the mixing operation can be made more efficient.

In the above cooking assistance robot, the mixing direction selector preferably sets the center of the cooking surface of the cooking container as the target position for making a mountain if there is no range of the cooking surface of the cooking container with the use frequency lower than the specified value.

According to this construction, even if no mountain of the specified height or higher is present and no range with the use frequency lower than the specified value is present, the ingredients in contact with the cooking surface of the cooking container and those located at the outer layer of the ingredients can be switched by temporarily making the mountain in the center of the cooking container and performing the above mountain leveling operation. Further, according to this construction, the ingredients can be evenly collected from the entire cooking surface of the cooking container toward the center of the cooking container. Furthermore, since the ingredients are collected toward the center of the cooking container in this construction, it can be reduced that the ingredients spill out of the cooking container as compared with the case where the ingredients are collected toward a part other than the center.

In the above cooking assistance robot, it is preferable that a temperature distribution measuring unit for measuring a temperature distribution in the cooking container is further provided; and that the mixing direction selector sets a position of the cooking surface of the cooking container with a maximum temperature as the target position for making a mountain and selects a direction from the edge of the cooking container toward the target position as the mixing direction.

According to this construction, since the mountain is made at the position of the cooking surface of the cooking container with the maximum temperature, i.e. in a range where the heat of the cooking surface of the cooking container has not effectively utilized yet, the heat of the cooking container can be effectively utilized. Further, since a period during which a part of the cooking container is heated more than necessary can be shortened in this construction, there is an effect of extending the life of the cooking container.

In the above cooking assistance robot, the mixing direction selector preferably sets the center of the cooking container as the target position for making a mountain and selects a direction from the edge of the cooking container toward the target position as the mixing direction.

According to this construction, the ingredients can be evenly collected from the entire cooking surface of the cooking container toward the center of the cooking container. Furthermore, since the ingredients are collected toward the center of the cooking container in this construction, it can be reduced that the ingredients spill out of the cooking container as compared with the case where the ingredients are collected toward a part other than the center.

In the above cooking assistance robot, the mixing direction selector preferably sets the center of the cooking container as the target position for making a mountain, sets a plurality of starting points on the edge of the cooking container, and selects a direction along a virtual vertical plane with a maximum variance with respect to the average height of the ingredients on this virtual vertical plane out of a plurality of virtual vertical planes perpendicular to the cooking surface of the cooking container and passing the target position and the corresponding starting points as the mixing direction.

According to this construction, in addition to the effect of collecting the ingredients toward the center of the cooking container as described above, a direction with a maximum height variance of the ingredients, i.e. a direction in which the mountain of the ingredients is insufficiently made can be detected. Therefore, a mountain making operation can be efficiently performed by performing the mixing operation in the detected direction.

In the above cooking assistance robot, it is preferable that a temperature distribution measuring unit for measuring a temperature distribution in the cooking container is further provided; and that the mixing direction selector sets the center of the cooking container as the target position for making a mountain, sets a plurality of points of division on the edge of the cooking container, and selects a direction from the edge of the cooking container to the target position set to pass an area with a minimum average temperature out of a plurality of areas on the cooking container divided by lines connecting the target position and the corresponding points of division.

According to this construction, the heat of the cooking container can be effectively utilized to evenly heat the ingredients since the ingredients insufficiently heated can be collected to the central area where the temperature of the cooking container is high.

In the above cooking assistance robot, the mix driving unit preferably performs the mixing operation by changing the position and angle of a mixer attached thereto in the cooking container and moves the mixer while inclining it such that a part of the mixer more distant from the cooking container moves ahead in the mixing direction in a mountain leveling operation.

According to this construction, the mountain of the ingredients in the cooking container can be accurately and safely leveled since the mixing operation is performed by exerting a direct force to the ingredients via the mixer. Since the mixer is moved while being inclined such that the part thereof distant from the cooking container moves ahead in the mixing direction in this construction, it can be suppressed that the ingredients spill out of the cooking container by pressing the ingredients dispersed from the mountain from above with an intermediate part of the mixer.

In the above cooking assistance robot, the mix driving unit preferably performs the mixing operation by changing the position and angle of a mixer attached thereto in the cooking container and moves the mixer while inclining it such that a part of the mixer closer to the cooking container moves ahead in the mixing direction in a mountain making operation.

According to this construction, the mixer is moved while being inclined such that the part thereof closer to the cooking container moves ahead in the mixing direction, i.e. while being laid such that the leading end thereof slips between the cooking surface of the cooking container and the ingredients. Thus, a mountain of the ingredients can be made while the ingredients in contact with the cooking surface of the cooking container are scooped up. Thus, according to this construction, the heat of the cooking container can be more evenly transferred to the ingredients by switching the ingredients in contact with the cooking surface of the cooking container and those located at the outer layer.

In the above cooking assistance robot, the mix driving unit preferably performs the mixing operation by changing the position and angle of the cooking container or shaking the cooking container.

According to this construction, external matters do not directly come into contact with the ingredients and no extra force is exerted to the ingredients. Therefore, even if the ingredients easily lose shape, the shape loss can be suppressed.

In the above cooking assistance robot, it is preferable that a mixing information storage for storing mixing information preset for the respective ingredients and cooking recipes and an operation instruction input unit for receiving the input of information including at least the type and used amount of the ingredients, the start of the operation and an operation time are further provided; and that the mixing operation by the mix driving unit is controlled based on the information inputted by the operation instruction input unit and the mixing information.

According to this construction, cooking suitable for the ingredients, e.g. a control of a mixing speed for reducing the shape loss of the ingredients can be performed, for example, based on the type of the ingredients inputted by a user.

In the above cooking assistance robot, it is preferable that a mixed state detector for detecting a mixed state of the ingredients based on the height distribution measured by the height distribution measuring unit is further provided; and that a heating amount, a heating time, a mixing direction and a mixing time are regulated based on the mixed state detected by the mixed state detector.

According to this construction, the heating amount, the heating time, the mixing direction and the mixing time can be regulated based on this mixed state since the mixed state of the ingredients can be detected.

In the above cooking assistance robot, it is preferable that the mix driving unit performs the mixing operation by changing the position and angle of a mixer attached thereto in the cooking container and includes a force detector for detecting an external force exerted to the mixer, a sound collector for recording sound given when the mixer comes into contact with an object other than the mixer and an abnormality detector for extracting sounds for a period from a point of time before a specified time to a timing of exceeding a specified threshold value when the external force exerted to the mixer exceeds the specified threshold value and detecting the presence or absence of an abnormal state by judging whether or not the intensity of frequency components near the natural frequency of the cooking container out of frequency components of the sounds is below a specified value; and that the mixing operation currently in process is stopped, judging that the ingredients are squeezed between the cooking container and the mixer, if the abnormal state is detected by the abnormality detector.

According to this construction, the mixing operation can be stopped if the ingredients are squeezed between the cooking container and the mixer. Thus, the shape loss of even relatively soft ingredients can be suppressed by suppressing the application of an excessive force to the ingredients.

A cooking assistance method according to another aspect of the present invention is a cooking assistance method for cooking by physically moving ingredients in a cooking container by a cooking assistance robot and comprises the steps of measuring a height distribution of the ingredients in the cooking container in the cooking assistance robot; judging whether or not any mountain of a specified height or higher is present in the cooking container in the cooking assistance robot; selecting, in the cooking assistance robot, a mixing direction for leveling the mountain in the presence of the mountain while selecting a mixing direction for making the mountain in the absence of the mountain; and performing a mountain making operation or a mountain leveling operation by moving the ingredients in the selected mixing direction by a mix driving unit of the cooking assistance robot.

According to the present invention, if the mountain of the specified height or higher is present in the cooking container, i.e. if the ingredients are accumulated at positions distanced upward from the cooking surface of the cooking container and difficult to heat, the ingredients at these positions are heated by being moved to lower positions. On the other hand, the mountain of the specified height or higher is absent, i.e. if the ingredients are relatively evenly dispersed in the cooking container, the ingredients in contact with the cooking surface of the cooking container and those located at the outer layer can be switched by temporarily making a mountain and performing the above mountain leveling operation. Therefore, the ingredients can be evenly heated.

Therefore, according to the present invention, it is possible to perform the efficient mixing, with which the ingredients in the cooking container are unlikely to be unevenly heated.

This application is based on Japanese Patent Application No. 2007-264280 filed on Oct. 10, 2007 and No. 2008-258882 filed on Oct. 3, 2008, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A cooking assistance robot, comprising:
a mix driving unit for performing a mixing operation of moving ingredients in a cooking container;
a height distribution measuring unit for measuring a distribution of a height of the ingredients from a cooking surface of the cooking container, the distribution of the height of the ingredients including the height of the ingredients at a plurality of positions on the cooking surface of the cooking container;
a mixing direction selector for selecting a mixing direction of the mixing operation if the height of the ingredients measured by the height distribution measuring unit is equal to or larger than a specified value; and
an operation instructing unit for instructing the mixing operation corresponding to the selected mixing direction to the mix driving unit, wherein
the mixing direction selector sets, as the mixing direction, a direction along a plane perpendicular to the cooking surface, passing an apex where the height of the ingredients is largest and having a maximum height variance of the ingredients with respect to an average height of the ingredients.

2. The cooking assistance robot according to claim claim 1, wherein the mixing direction selector sets the apex as a movement starting point, and
wherein, out of two intersection points intersections where the plane perpendicular to the cooking surface and an edge of the cooking container intersect, an intersection point that is more distant from the apex is set as a movement target point.

3. The cooking assistance robot according to claim 1, wherein the mix driving unit performs the mixing operation by inclining a mixer attached thereto.

4. The cooking assistance robot according to claim 3, wherein the mix driving unit performs the mixing operation while inclining the mixer such that, in a mountain making operation, a part of the mixer closer to the cooking container moves ahead in the mixing direction.

5. The cooking assistance robot according to claim 1, wherein the mix driving unit performs the mixing operation by changing a position and angle of the cooking container.

6. The cooking assistance robot according to claim 1, wherein:
the mixing direction is set based on (i) a cooking recipe, (ii) a type and a used amount of the ingredients, and (iii) an operation time and
the mixing operation corresponding to the set mixing direction by the mix driving unit is performed.

7. The cooking assistance robot according to claim 1, further comprising a mixed state detector for detecting a mixed state of the ingredients based on the distribution measured by the height distribution measuring unit, wherein
the mixed state is judged to be insufficient, if a height variance of the ingredients is equal to or larger than a predetermined threshold value, and
the mix driving unit regulates a heating time, the mixing direction and a mixing time of the ingredients based on the mixed state detected by the mixed state detector.

8. The cooking assistance robot according to claim 1, further comprising:
a force detector for detecting an external force exerted to a mixer attached to the mix driving unit;
a sound collector for recording sound given when the mixer comes into contact with an object other than the mixer; and
an abnormality detector for detecting an abnormality of the mixing operation based on whether a content of frequency components near a natural frequency of a material for constructing the cooking container out of frequency components of sound extracted from the sound collector is below a predetermined threshold value, when the external force exerted to the mixer exceeds a specified threshold value, wherein the mix driving unit executes a control to stop the mixing operation if the abnormal state is detected by the abnormality detector.

9. A cooking assistance robot, comprising:
a mix driving unit for performing a mixing operation of moving ingredients in a cooking container;
a height distribution measuring unit for measuring a distribution of a height of the ingredients from a cooking surface of the cooking container, the distribution of the height of the ingredients including the height of the ingredients at a plurality of positions on the cooking surface of the cooking container;
a mixing direction selector for selecting a mixing direction of the mixing operation if the height of the ingredients measured by the height distribution measuring unit is equal to or larger than a specified value;
an operation instructing unit for instructing the mixing operation corresponding to the selected mixing direction to the mix driving unit; and
an operation history recording unit for recording presence times at which the ingredients have been present in a plurality of areas set on the cooking surface as a history of mixing operations by the mix driving unit, wherein
the mixing direction selector (i) specifies an area of the cooking surface with a use frequency lower than a second specified value based on the history of the mixing operations, (ii) sets a mountain making target position in the specified area with the low use frequency, and (iii) selects a direction from an edge of the cooking container toward the mountain making target position as the mixing direction.

10. The cooking assistance robot according to claim 9, wherein the mixing direction selector sets, as the mixing direction, a direction along a line segment having a specified length or longer out of a plurality of line segments connecting a plurality of start candidate positions set on the edge of the cooking container and the mountain making target position.

11. The cooking assistance robot according to claim 9, wherein the mixing direction selector sets a center of the cooking surface of the cooking container as the mountain making target position if the use frequency is higher than the second specified value for the entire cooking surface of the cooking container.

12. The cooking assistance robot according to claim 9, further comprising a temperature distribution measuring unit for measuring a temperature distribution of the cooking surface of the cooking container, wherein the mixing direction selector (i) sets a position of the cooking surface of the cooking container having a maximum temperature as the mountain making target position and (ii) selects a direction toward the mountain making target position as the mixing direction.

13. The cooking assistance robot according to claim 9, wherein the mixing direction selector (i) sets a center of the cooking surface of the cooking container as the mountain making target position and (ii) selects a direction toward the mountain making target position as the mixing direction.

14. The cooking assistance robot according to claim 9, wherein the mixing direction selector (i) sets a center of the cooking surface of the cooking container as the mountain making target position, (ii) sets a plurality of start candidate positions on the edge of the cooking container, and (iii) selects, as the mixing direction, a direction (a) along a plane with a maximum height variance of the ingredients with respect to an average height of the ingredients out of a plurality of planes passing the mountain making target position and the corresponding start candidate positions and (b) vertical to the cooking surface of the cooking container.

15. The cooking assistance robot according to claim 9, further comprising a temperature distribution measuring unit for measuring a temperature distribution of a surface of the ingredients, wherein the mixing direction selector (i) sets a center of the cooking surface of the cooking container as the mountain making target position, (ii) sets a plurality of points of division on the edge of the cooking container, and (iii) selects, as the mixing direction, a direction passing an area with a minimum average temperature of the surface of the ingredients out of a plurality of areas on the cooking container divided by lines connecting the mountain making target position and respective points of division of the plurality of points of division.

16. A cooking assistance method performed by a cooking assistance robot, the cooking assistance method comprising:
measuring a distribution of a height of ingredients from a cooking surface of a cooking container in a cooking assistance robot, the distribution of the height of the ingredients including the height of the ingredients at a plurality of positions on the cooking surface of the cooking container;
judging whether or not the height of the ingredients in the cooking container is equal to or larger than a specified height in the cooking assistance robot;
selecting, in the cooking assistance robot, a mixing direction for leveling a mountain of the ingredients in a presence of the mountain of the ingredients having the specified height or higher while selecting a mixing direction for making the mountain of the ingredients in a presence of areas that are only lower than the specified height; and
moving the ingredients in the selected mixing direction using a mix driving unit of the cooking assistance robot, wherein:
the mixing direction for leveling the mountain of ingredients is a direction along a plane perpendicular to the cooking surface, passing an apex where the height of the ingredients is largest and having a maximum height variance of the ingredients with respect to an average height of the ingredients; and
the mixing direction for making the mountain of ingredients is a direction from an edge of the cooking container toward a mountain making target position set in an area of the cooking surface with a low use frequency lower than a specified value, the area with the low use frequency being specified based on a history of mixing operations including presence times at which the ingredients have been present in a plurality of areas set on the cooking surface.

* * * * *